United States Patent
Narayanan et al.

(10) Patent No.: US 11,277,394 B2
(45) Date of Patent: *Mar. 15, 2022

(54) MANAGING CREDENTIALS OF MULTIPLE USERS ON AN ELECTRONIC DEVICE

(71) Applicant: Apple Inc., Cupertino, CA (US)

(72) Inventors: Karthik Narayanan, London (GB); Navin Bindiganavile Suparna, Santa Clara, CA (US); Scott Lopatin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/792,809

(22) Filed: Feb. 17, 2020

(65) Prior Publication Data
US 2020/0186561 A1  Jun. 11, 2020

Related U.S. Application Data

(63) Continuation of application No. 15/704,849, filed on Sep. 14, 2017, now Pat. No. 10,567,408.

(60) Provisional application No. 62/399,166, filed on Sep. 23, 2016.

(51) Int. Cl.
| | |
|---|---|
| *H04L 29/06* | (2006.01) |
| *H04L 67/306* | (2022.01) |
| *H04W 12/02* | (2009.01) |
| *H04W 12/06* | (2021.01) |
| *H04W 12/03* | (2021.01) |
| *H04W 12/065* | (2021.01) |

(52) U.S. Cl.
CPC .............. *H04L 63/08* (2013.01); *H04L 63/06* (2013.01); *H04L 63/083* (2013.01); *H04L 63/1425* (2013.01); *H04L 67/306* (2013.01); *H04W 12/02* (2013.01); *H04W 12/03* (2021.01); *H04W 12/06* (2013.01); *H04W 12/065* (2021.01); *H04W 12/068* (2021.01)

(58) Field of Classification Search
CPC ..... H04L 63/08; H04L 63/06; H04L 63/1425; H04W 12/068
See application file for complete search history.

(56) References Cited

U.S. PATENT DOCUMENTS

| | | | |
|---|---|---|---|
| 2012/0316992 A1 | 12/2012 | Oborne | |
| 2013/0219473 A1 | 8/2013 | Schaefer | |
| 2013/0262857 A1* | 10/2013 | Neuman | .......... H04L 63/18 713/155 |
| 2014/0222682 A1* | 8/2014 | Dua | .......... G06Q 20/327 705/44 |

(Continued)

FOREIGN PATENT DOCUMENTS

| | | |
|---|---|---|
| CA | 2960319 A1 | 3/2016 |
| CN | 101714921 A | 5/2010 |

(Continued)

OTHER PUBLICATIONS

Chinese Patent Application No. 201780042138.X—First Office Action dated Dec. 15, 2020.
European Patent Application 21173918.0—Extended European Search Report dated Jul. 14, 2021.

*Primary Examiner* — Wasika Nipa
(74) *Attorney, Agent, or Firm* — Dickinson Wright RLLP

(57) ABSTRACT

Systems, methods, and computer-readable media for managing credentials of multiple users on an electronic device are provided.

20 Claims, 9 Drawing Sheets

(56) References Cited

U.S. PATENT DOCUMENTS

| | | | |
|---|---|---|---|
| 2014/0229739 A1* | 8/2014 | Roth | H04L 63/0442 713/189 |
| 2014/0281506 A1 | 9/2014 | Redberg et al. | |
| 2014/0344153 A1* | 11/2014 | Raj | G06Q 20/3821 705/44 |
| 2014/0372319 A1 | 12/2014 | Wolovitz | |
| 2015/0199676 A9* | 7/2015 | Elgar | G06F 3/04845 705/14.27 |
| 2015/0199679 A1* | 7/2015 | Palanisamy | G06Q 20/34 705/67 |
| 2015/0264050 A1 | 9/2015 | Neuman et al. | |
| 2015/0371234 A1 | 12/2015 | Huang et al. | |
| 2016/0092696 A1 | 3/2016 | Guglani et al. | |
| 2016/0140546 A1 | 5/2016 | Taratine et al. | |
| 2016/0164680 A1 | 6/2016 | Liao et al. | |

FOREIGN PATENT DOCUMENTS

| | | |
|---|---|---|
| CN | 102254264 A | 11/2011 |
| CN | 102891859 A | 1/2013 |
| CN | 103765454 A | 4/2014 |
| CN | 104115464 A | 10/2014 |
| CN | 104980925 A | 10/2015 |
| CN | 105229985 A | 1/2016 |
| CN | 105493115 A | 4/2016 |
| CN | 105701661 B | 3/2020 |
| JP | 2016-511995 A | 4/2016 |
| KR | 10-2015-0130517 A | 11/2015 |
| KR | 10-2016-0035028 A | 3/2016 |
| KR | 10-2017-0095404 A | 8/2017 |
| WO | 2013045898 A2 | 4/2013 |

\* cited by examiner

```
┌─────────────────────────────────────────────────────────────────────────┐
│ WHEN A FIRST USER AUTHENTICATES THE PROVISIONING OF A FIRST CREDENTIAL  │
│ OF A PLURALITY OF CREDENTIALS ON AN ELECTRONIC DEVICE, USING A          │
│ CREDENTIAL PROTECTION SERVER TO: (1) STORE, AT THE CREDENTIAL           │
│ PROTECTION SERVER, A FIRST SUSPENSION TOKEN AGAINST A DEVICE            │
│ IDENTIFIER OF THE ELECTRONIC DEVICE AND AGAINST A FIRST USER            │
│ IDENTIFIER OF THE FIRST USER AND AGAINST A FIRST CREDENTIAL             │
│ IDENTIFIER OF THE FIRST CREDENTIAL; AND (2) PROVISION THE FIRST         │
│ CREDENTIAL AND THE FIRST SUSPENSION TOKEN ON THE ELECTRONIC DEVICE      │
│                                  502                                    │
└─────────────────────────────────────────────────────────────────────────┘
                                    ↓
┌─────────────────────────────────────────────────────────────────────────┐
│ WHEN A SECOND USER AUTHENTICATES THE PROVISIONING OF A SECOND           │
│ CREDENTIAL OF THE PLURALITY OF CREDENTIALS ON THE ELECTRONIC DEVICE,    │
│ USING THE CREDENTIAL PROTECTION SERVER TO: (1) STORE, AT THE            │
│ CREDENTIAL PROTECTION SERVER, A SECOND SUSPENSION TOKEN AGAINST THE     │
│ DEVICE IDENTIFIER AND AGAINST A SECOND USER IDENTIFIER OF THE SECOND    │
│ USER AND AGAINST A SECOND CREDENTIAL IDENTIFIER OF THE SECOND           │
│ CREDENTIAL; AND (2) PROVISION THE SECOND CREDENTIAL AND THE SECOND      │
│ SUSPENSION TOKEN ON THE ELECTRONIC DEVICE                               │
│                                  504                                    │
└─────────────────────────────────────────────────────────────────────────┘
                                    ↓
┌─────────────────────────────────────────────────────────────────────────┐
│ WHEN THE SECOND USER ENABLES A PROTECTION SERVICE OF THE ELECTRONIC     │
│ DEVICE ON THE ELECTRONIC DEVICE, USING A DEVICE PROTECTION SERVER TO    │
│ STORE, AT THE DEVICE PROTECTION SERVER, THE FIRST SUSPENSION TOKEN      │
│ AND THE SECOND SUSPENSION TOKEN AGAINST THE DEVICE IDENTIFIER AND       │
│ AGAINST THE SECOND USER IDENTIFIER                                      │
│                                  506                                    │
└─────────────────────────────────────────────────────────────────────────┘
                                    ↓
┌─────────────────────────────────────────────────────────────────────────┐
│ WHEN A PROTECTION MODE IS ACTIVATED FOR THE PROTECTION SERVICE, USING   │
│ THE DEVICE PROTECTION SERVER TO: (1) AUTHENTICATE THE SECOND USER       │
│ USING THE SECOND USER IDENTIFIER; (2) IDENTIFY EACH ONE OF THE FIRST    │
│ SUSPENSION TOKEN AND THE SECOND SUSPENSION TOKEN AS STORED AT THE       │
│ DEVICE PROTECTION SERVER AGAINST THE DEVICE IDENTIFIER AND AGAINST      │
│ THE SECOND USER IDENTIFIER; AND (3) SHARE EACH ONE OF THE IDENTIFIED    │
│ FIRST SUSPENSION TOKEN AND THE IDENTIFIED SECOND SUSPENSION TOKEN       │
│ WITH THE CREDENTIAL PROTECTION SERVER                                   │
│                                  508                                    │
└─────────────────────────────────────────────────────────────────────────┘
                                    ↓
┌─────────────────────────────────────────────────────────────────────────┐
│ WHEN EACH ONE OF THE IDENTIFIED FIRST SUSPENSION TOKEN AND THE          │
│ IDENTIFIED SECOND SUSPENSION TOKEN IS SHARED BY THE DEVICE PROTECTION   │
│ SERVER WITH THE CREDENTIAL PROTECTION SERVER, USING THE CREDENTIAL      │
│ PROTECTION SERVER TO: (1) SUSPEND EACH CREDENTIAL OF THE PLURALITY OF   │
│ CREDENTIALS THAT IS STORED AT THE CREDENTIAL PROTECTION SERVER          │
│ AGAINST THE IDENTIFIED FIRST SUSPENSION TOKEN; AND (2) SUSPEND EACH     │
│ CREDENTIAL OF THE PLURALITY OF CREDENTIALS THAT IS STORED AT THE        │
│ CREDENTIAL PROTECTION SERVER AGAINST THE IDENTIFIED SECOND              │
│ SUSPENSION TOKEN                                                        │
│                                  510                                    │
└─────────────────────────────────────────────────────────────────────────┘
                                    ↓
┌─────────────────────────────────────────────────────────────────────────┐
│ WHEN THE SECOND USER AUTHENTICATES THE SECOND USER ON THE               │
│ ELECTRONIC DEVICE USING THE SECOND USER IDENTIFIER WHILE THE SECOND     │
│ CREDENTIAL IS SUSPENDED, USING THE CREDENTIAL PROTECTION SERVER TO:     │
│ (1) AUTHENTICATE THE SECOND USER USING THE SECOND USER IDENTIFIER       │
│ FROM THE ELECTRONIC DEVICE; AND (2) UNSUSPEND EACH CREDENTIAL OF THE    │
│ PLURALITY OF CREDENTIALS THAT HAS A CREDENTIAL IDENTIFIER STORED AT     │
│ THE CREDENTIAL PROTECTION SERVER AGAINST THE SECOND USER IDENTIFIER     │
│                                  512                                    │
└─────────────────────────────────────────────────────────────────────────┘
                                   500

FIG. 5
```

```
┌─────────────────────────────────────────────────────────────────────┐
│ RECEIVE, WITH A DEVICE PROTECTION SERVER FROM AN ELECTRONIC DEVICE, │
│ DEVICE SUSPENSION DATA INCLUDING A FIRST SUSPENSION TOKEN THAT IS   │
│ ASSOCIATED WITH A FIRST CREDENTIAL FOR A FIRST USER ASSOCIATED WITH │
│ A FIRST USER IDENTIFIER ON THE ELECTRONIC DEVICE, A SECOND          │
│ SUSPENSION TOKEN THAT IS ASSOCIATED WITH A SECOND CREDENTIAL FOR A  │
│ SECOND USER ASSOCIATED WITH A SECOND USER IDENTIFIER ON THE         │
│ ELECTRONIC DEVICE, A DEVICE IDENTIFIER OF THE ELECTRONIC DEVICE,    │
│ AND THE SECOND USER IDENTIFIER                                      │
│                                 702                                 │
└─────────────────────────────────────────────────────────────────────┘
                                    ↓
┌─────────────────────────────────────────────────────────────────────┐
│ STORE THE RECEIVED DEVICE SUSPENSION DATA AT THE DEVICE PROTECTION  │
│                               SERVER                                │
│                                 704                                 │
└─────────────────────────────────────────────────────────────────────┘
                                    ↓
┌─────────────────────────────────────────────────────────────────────┐
│ AFTER THE DEVICE SUSPENSION DATA IS STORED, RECEIVE, WITH THE       │
│ DEVICE PROTECTION SERVER, A DEVICE PROTECTION ENABLEMENT REQUEST    │
│ INCLUDING THE DEVICE IDENTIFIER AND THE SECOND USER IDENTIFIER      │
│                                 706                                 │
└─────────────────────────────────────────────────────────────────────┘
                                    ↓
┌─────────────────────────────────────────────────────────────────────┐
│ IDENTIFY, WITH THE DEVICE PROTECTION SERVER, EACH ONE OF THE FIRST  │
│ SUSPENSION TOKEN AND THE SECOND SUSPENSION TOKEN AS BEING STORED AT │
│ THE DEVICE PROTECTION SERVER IN THE STORED DEVICE SUSPENSION DATA   │
│ WITH BOTH THE DEVICE IDENTIFIER AND THE SECOND USER IDENTIFIER OF   │
│ THE RECEIVED DEVICE PROTECTION ENABLEMENT REQUEST                   │
│                                 708                                 │
└─────────────────────────────────────────────────────────────────────┘
                                    ↓
┌─────────────────────────────────────────────────────────────────────┐
│ COMMUNICATE, FROM THE DEVICE PROTECTION SERVER TO A REMOTE          │
│ SUBSYSTEM, CREDENTIAL SUSPENSION DATA THAT IS OPERATIVE TO INSTRUCT │
│ THE REMOTE SUBSYSTEM TO SUSPEND EVERY CREDENTIAL ASSOCIATED WITH    │
│ THE IDENTIFIED FIRST SUSPENSION TOKEN AND TO SUSPEND EVERY          │
│ CREDENTIAL ASSOCIATED WITH THE IDENTIFIED SECOND SUSPENSION TOKEN   │
│                                 710                                 │
└─────────────────────────────────────────────────────────────────────┘

MANAGING CREDENTIALS OF MULTIPLE USERS ON AN ELECTRONIC DEVICE

CROSS-REFERENCE TO RELATED APPLICATION(S)

This application is a continuation of U.S. patent application Ser. No. 15/704,849, filed Sep. 14, 2017 (now U.S. Pat. No. 10,567,408), which claims the benefit of prior filed U.S. Provisional Patent Application No. 62/399,166, filed Sep. 23, 2016, each of which is hereby incorporated by reference herein in its entirety.

TECHNICAL FIELD

This disclosure relates to managing credentials on an electronic device, including managing credentials of multiple users on an electronic device.

BACKGROUND OF THE DISCLOSURE

Portable electronic devices (e.g., cellular telephones and laptop computers) may be provided with secure elements for enabling secure transaction communications with another entity (e.g., a merchant). Often times, these communications are associated with commercial transactions or other secure data transactions that require the electronic device to generate, access, and/or share a native payment credential, such as a credit card credential, on the secure element with the other entity. However, storage of different native payment credentials for different users on a single electronic device has often been inefficient.

SUMMARY OF THE DISCLOSURE

This document describes systems, methods, and computer-readable media for managing credentials of multiple users on an electronic device.

As an example, a method is provided for managing a plurality of credentials on an electronic device using an administration entity subsystem including a device protection server and a credential protection server, wherein the electronic device may be associated with a device identifier and may be used by a first user associated with a first user identifier and by a second user associated with a second user identifier, where the method may include, when the first user authenticates the provisioning of a first credential of the plurality of credentials on the electronic device, using the credential protection server to store, at the credential protection server, a first suspension token against the device identifier and against the first user identifier and against a first credential identifier of the first credential and provision the first credential and the first suspension token on the electronic device, when the second user authenticates the provisioning of a second credential of the plurality of credentials on the electronic device, using the credential protection server to store, at the credential protection server, a second suspension token against the device identifier and against the second user identifier and against a second credential identifier of the second credential and provision the second credential and the second suspension token on the electronic device, when the second user enables a protection service of the electronic device on the electronic device, using the device protection server to store, at the device protection server, the first suspension token and the second suspension token against the device identifier and against the second user identifier, when a protection mode is activated for the protection service of the electronic device enabled by the second user, using the device protection server to authenticate the second user using the second user identifier, identify each one of the first suspension token and the second suspension token as stored at the device protection server against the device identifier of the electronic device and against the second user identifier, and share each one of the identified first suspension token and the identified second suspension token with the credential protection server, when each one of the identified first suspension token and the identified second suspension token is shared by the device protection server with the credential protection server, using the credential protection server to suspend each credential of the plurality of credentials that is stored at the credential protection server against the identified first suspension token and suspend each credential of the plurality of credentials that is stored at the credential protection server against the identified second suspension token, and, when the second user authenticates the second user on the electronic device using the second user identifier while the second credential is suspended, using the credential protection server to authenticate the second user using the second user identifier from the electronic device and unsuspend each credential of the plurality of credentials that has a credential identifier stored at the credential protection server against the second user identifier.

As another example, a method is provided for protecting an electronic device using a device protection server, wherein the electronic device may include a device identifier, wherein the electronic device may also include a first suspension token and an associated first credential for a first user associated with a first user identifier, and wherein the electronic device may also include a second suspension token and an associated second credential for a second user associated with a second user identifier. The method may include receiving, with the device protection server from the electronic device, device suspension data including the first suspension token, the second suspension token, the device identifier, and the second user identifier. The method may also include storing the received device suspension data at the device protection server, and after the storing, receiving with the device protection server, a device protection enablement request including the device identifier and the second user identifier. The method may also include identifying, with the device protection server, each one of the first suspension token and the second suspension token as being stored at the device protection server in the stored device suspension data with both the device identifier and the second user identifier of the received device protection enablement request. The method may also include communicating, from the device protection server to a remote subsystem, credential suspension data that is operative to instruct the remote subsystem to suspend every credential associated with the identified first suspension token and to suspend every credential associated with the identified second suspension token.

As yet another example, a device protection server is provided for protecting an electronic device, wherein the electronic device may include a device identifier, wherein the electronic device may also include a first suspension token and an associated first credential for a first user associated with a first user identifier, and wherein the electronic device may also include a second suspension token and an associated second credential for a second user associated with a second user identifier. The device protection server may include a memory component including a plurality of data entries. The device protection server may also include a communications component operative to receive device suspension data from the electronic device that includes the first suspension token, the second suspension token, and the second user identifier. The device protection server may also include a processor operative to store in a data entry of the plurality of data entries each one of the first suspension token of the device suspension data and the second suspension token of the device suspension data against the second user identifier of the device suspension data only when no data entry of the plurality of data entries is storing at least one of the first suspension token of the device suspension data and the second suspension token of the device suspension data against the first user identifier.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIGS. 5-7 are flowcharts of illustrative processes for managing credentials on an electronic device.

DETAILED DESCRIPTION OF THE DISCLOSURE

One or more first user credentials (e.g., a payment credential or any other suitable transaction credential) may be provisioned on a secure element of a host electronic device for use by an authenticated first user of the device, while one or more second user credentials may also be provisioned on the device for use by an authenticated second user of the device. An administration entity subsystem may be operated by an administration entity for providing a layer of security and/or for providing a more convenient user experience to the use of such user credentials. A credential protection subsystem of such an administration entity subsystem may be operative to manage the provisioning of such user credentials on the electronic device (e.g., from a credential issuer subsystem), while a device protection subsystem of such an administration entity subsystem may be operative to provide one or more device protection services for protecting the electronic device if it were to be reported lost or stolen. However, when such an electronic device may include sensitive data from two or more different users, such as a provisioned first user credential and a provisioned second user credential, such a device protection subsystem may be configured to suspend the functionality of all user credentials provisioned on the device when the device is to be protected when lost, so as to protect all such sensitive data. Such protection may include the device protection subsystem instructing the credential protection subsystem to suspend or otherwise prevent the use of each user credential on the device from being used in any transaction (e.g., with a credential issuer subsystem and/or service provider subsystem), whereby the credential protection subsystem may be operative to prevent the secure communication of any credential data from the device and/or to instruct a credential issuer subsystem to reject any transactions using credentials provisioned on the device being protected. However, in such embodiments, in order to limit the potential for privacy and/or security breaches, the administration entity subsystem may be operative to prevent the device protection subsystem from storing information at the device protection subsystem that may specifically link two or more particular users to the particular electronic device. Instead, a system of the disclosure may use user-anonymous suspension tokens, each of which may be associated with a particular user of the electronic device at the credential protection subsystem but may not be associated with a particular user at the device protection subsystem, such that the device protection subsystem may not have access to data that may be used to identify two or more particular users to a single electronic device.

Figure 1:
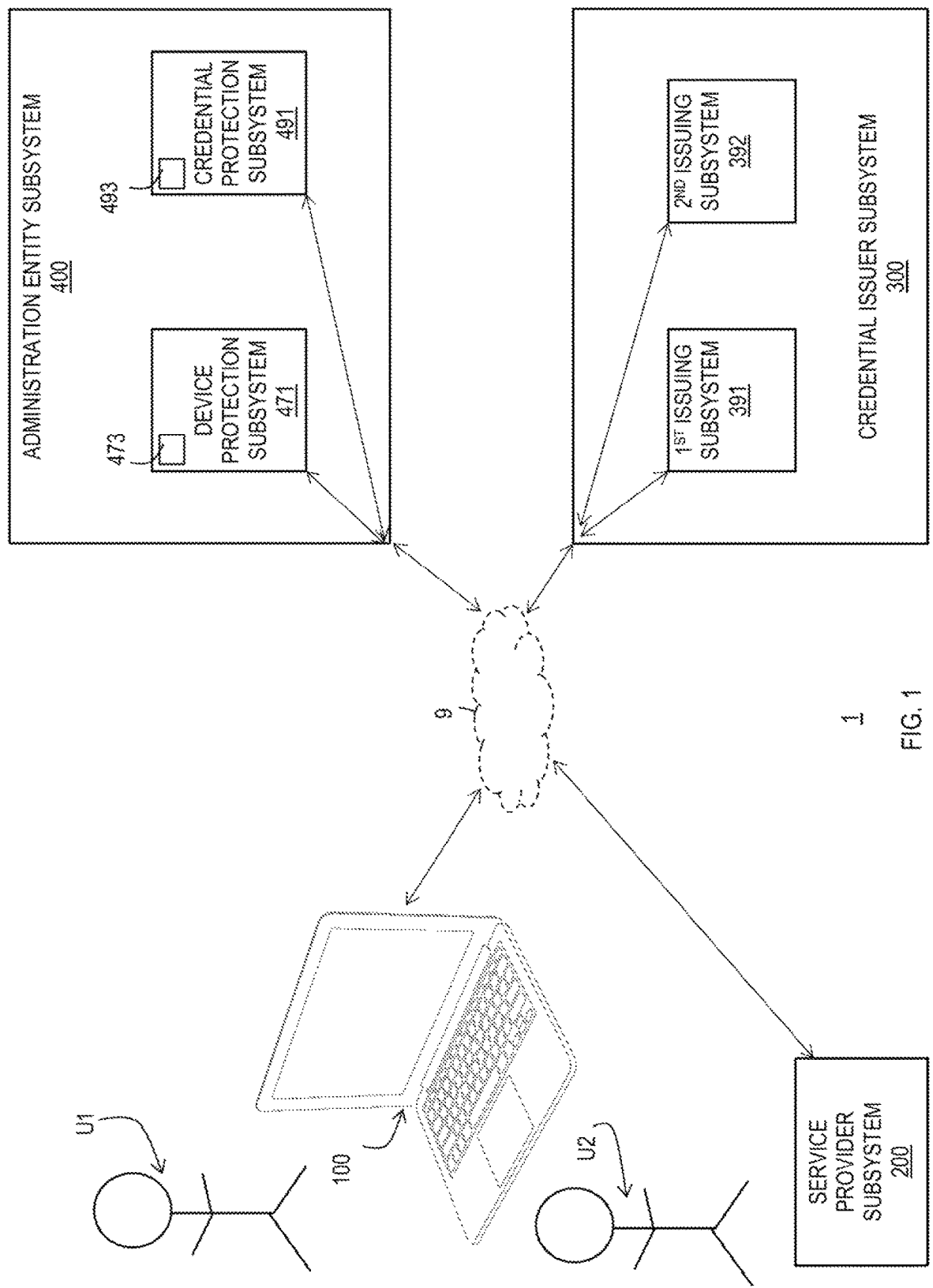
FIG. 1 is a schematic view of an illustrative system for managing credentials on an electronic device.

Description of FIG. 1

FIG. 1 is a schematic view of an illustrative system 1 that may allow for the management of credentials of multiple users on an electronic device. For example, as shown in FIG. 1, system 1 may include a multiple end-user host electronic device 100 (e.g., a laptop computer (see, e.g., FIG. 1) or a smart phone (see, e.g., FIG. 3)) with at least one first user credential of a first user U1 provisioned thereon and with at least one second user credential of a second user U2 provisioned thereon (e.g., on a secure element of host electronic device 100). System 1 may also include an administration (or commercial or trusted) entity subsystem 400, a service provider (or merchant or processing) subsystem 200, and a credential issuer subsystem 300. System 1 may also include an acquiring (or payment processor) subsystem (not shown) that may utilize credential data generated by a credential provisioned on host device 100 for completing a transaction with issuer subsystem 300 on behalf of SP subsystem 200. Communication of any suitable data between any two of host electronic device 100, service provider ("SP") subsystem 200, administration entity ("AE") subsystem 400, and credential issuer (or financial institution) subsystem 300 may be enabled via any suitable communications set-up 9, which may include any suitable wired communications path, any suitable wireless communications path, or any suitable combination of two or more wired and/or wireless communications paths using any suitable communications protocol(s) and/or any suitable network(s) and/or cloud architecture(s). Each communications paths between any two devices or subsystems of system 1 using communications set-up 9 may be at least partially managed by one or more trusted service managers ("TSMs"). Any suitable circuitry, device, system, or combination of these (e.g., a wireless communications infrastructure that may include one or more communications towers, telecommunications servers, or the like) that may be operative to create a communications network may be used to provide one or more of such communications paths, which may be capable of providing communications using any suitable wired or wireless communications protocol. For example, one or more of such communications paths may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz commtmication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

A transaction credential (e.g., a payment credential or any other suitable transaction credential) may be provisioned on host electronic device 100 (e.g., on a secure element or other storage component of host electronic device 100) from any suitable credential issuer subsystem 300 (e.g., an issuing bank subsystem or financial institution subsystem), either directly from the credential issuer subsystem or via AE subsystem 400, which may be operative to securely communicate credential data onto host device 100 and manage such credential data. For example, credential issuer subsystem 300 may include a first issuing subsystem 391 that may be operated by at least one first credential issuing institution (e.g., a first issuing bank, such as Wells Fargo of San Francisco, Calif.) with or without a first payment network institution (e.g., a first payment network, such as MasterCard of Purchase, N.Y.) for provisioning at least one first user transaction credential on host device 100 (e.g., directly or via AE subsystem 400 (e.g., via a credential protection subsystem 491 of AE subsystem 400)) for first user U1. Credential issuer subsystem 300 may include a second issuing subsystem 392 that may be operated by at least one second credential issuing institution (e.g., a second issuing bank, such as Citibank of Sioux Falls, S. Dak.) with or without a second payment network institution (e.g., a second payment network, such as Visa of Foster City, Calif.) for provisioning at least one second user transaction credential on host device 100 (e.g., directly or via AE subsystem 400 (e.g., via credential protection subsystem 491 of AE subsystem 400)) for second user U2. It is to be understood, however, that first issuing subsystem 391 may be operative to provision one or more first user transaction credentials on device 100 for first user U1 as well as one or more second user transaction credentials on device 100 for second user U2, where no issuing subsystem may only be used to provision transaction credentials for a particular user. Once provisioned on host device 100, a transaction credential may then be used by host device 100 for securely funding or otherwise conducting a transaction (e.g., a commercial or financial transaction or any other suitable credential transaction) with SP subsystem 200 (e.g., any suitable subsystem that may be operative to provide access to any suitable good or service as part of a transaction). For example, while interfacing with service provider ("SP") subsystem 200 (e.g., via an online resource (e.g., an online app or web browser) or via a contactless proximity-based communication medium) for accessing (e.g., purchasing) a service provider product or service, host device 100 may identify a particular transaction credential to be used for funding or otherwise furthering a transaction to access the service provider product.

AE subsystem 400 may include credential protection subsystem 491 that may be operative to provide an additional layer of security and/or efficiency to the provisioning of credentials on device 100 and/or to the sharing of credential data from host device 100 to SP subsystem 200 for furthering a transaction. For example, credential protection subsystem 491 may be operative to validate the trustworthiness of one or more issuing subsystems of credential issuer subsystem 300 on behalf of device 100 prior to enabling credential provisioning from an issuing subsystem onto device 100, and/or credential protection subsystem 491 may be operative to encrypt, encode, or otherwise secure the communication of transaction credential information from an issuing subsystem to device 100 for ensuring secure credential provisioning on device 100. Additionally or alternatively, credential protection subsystem 491 may be operative to validate the trustworthiness of SP subsystem 200 on behalf of device 100 prior to enabling transaction credential data to be shared from device 100 to SP subsystem 200, and/or credential protection subsystem 491 may be operative to encrypt, encode, or otherwise secure the communication of transaction credential data from device 100 to SP subsystem 200 for ensuring secure transaction credential data sharing for furthering a transaction between device 100 and SP subsystem 200.

Moreover, AE subsystem 400 may include a device protection subsystem 471 that may be operative to provide an additional layer of security to host device 100 (e.g., if device 100 were to be lost or stolen). Device protection subsystem 471 may enable a user of device 100 to register device 100 with a service of device protection subsystem 471 that may be operative to track the location of device 100 and/or remotely control one or more functions of device 100, such as turn on an alarm and/or erase or suspend or otherwise terminate the usefulness of certain device content, such as suspend the ability for the secure element of device 100 to generate transaction credential data for use in furthering a transaction with a service provider. Such a service may be useful to a device owner when device 100 may be lost or stolen such that the device may be recovered and/or such that sensitive data on the device may not be accessed.

However, when host device 100 may include sensitive data from two or more different users, such as a provisioned first user transaction credential of first user U1 and a provisioned second user transaction credential of second user U2, device protection subsystem 471 may be configured to suspend all user transaction credentials provisioned on host device 100 when device 100 is lost, so as to protect all such sensitive data. Such protection may include device protection subsystem 471 instructing credential protection subsystem 491 to suspend or otherwise prevent the use of credentials on device 100 from being used in any transaction (e.g., with SP subsystem 200), whereby credential protection subsystem 491 may be operative to prevent the secure communication of any credential data from device 100 to SP subsystem 200 and/or to instruct credential issuer subsystem 300 to reject any transactions using credentials provisioned on device 100. However, in such embodiments, in order to limit the potential for privacy and/or security breaches, AE subsystem 400 may be operative to prevent device protection subsystem 471 from storing information at device protection subsystem 471 (e.g., in a table or any other suitable data structure 473 of a server or other suitable component of device protection subsystem 471) that may specifically link two or more particular users to a particular device (e.g., first user U1 and second user U2 to host device 100). Instead, system 1 may use user-anonymous suspension tokens, each of which may be associated with a particular user of device 100 at credential protection subsystem 491 (e.g., in a table or any other suitable data structure 493 of a server or other suitable component of credential protection subsystem 491) but may not be associated with a particular user at device protection subsystem 471, such that device protection subsystem 471 may not have access to data that may be used to identify two or more particular users to a single electronic device.

Figure 2:
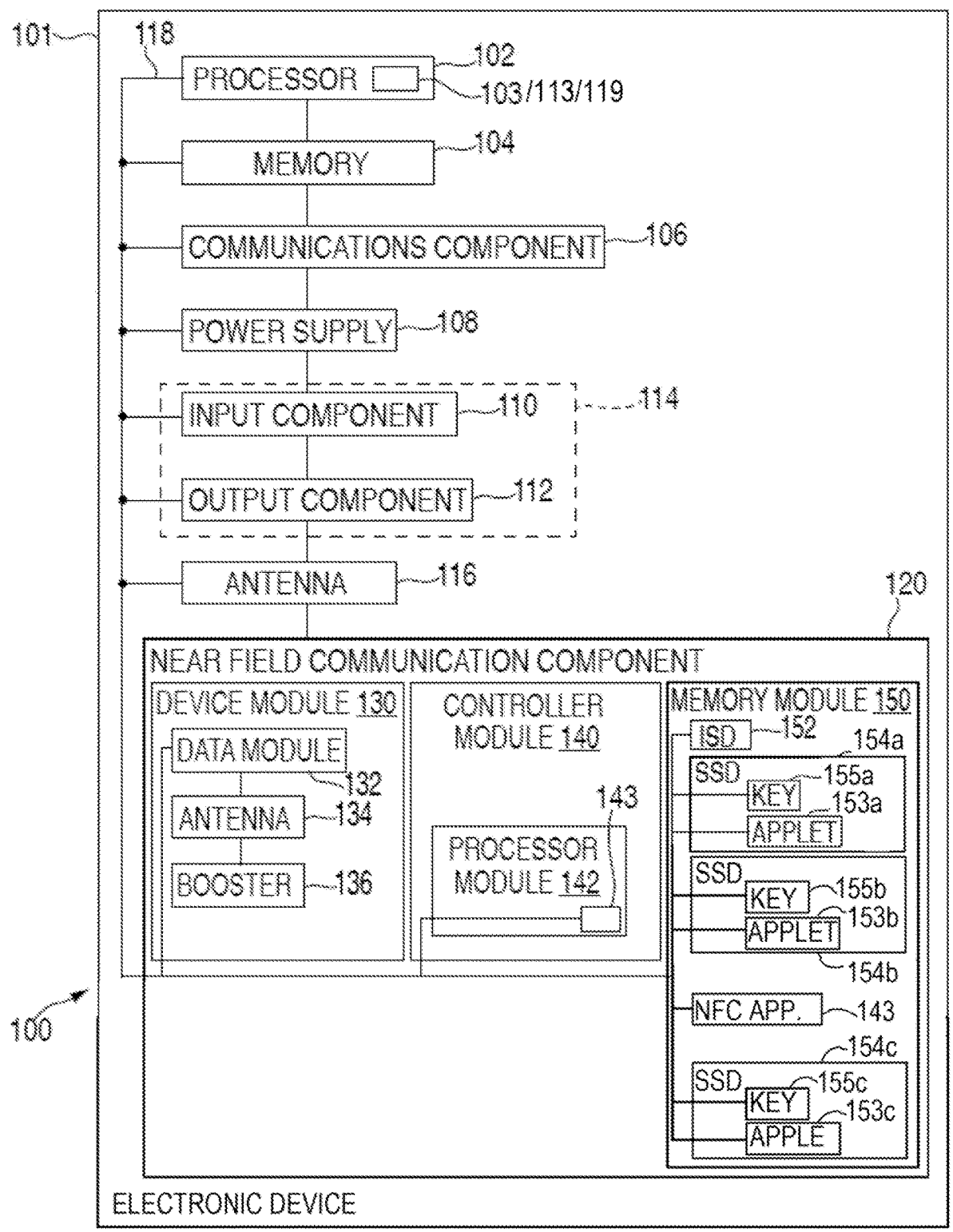
FIG. 2 is a more detailed schematic view of the electronic device of the system of FIG. 1.
Figure 2A:
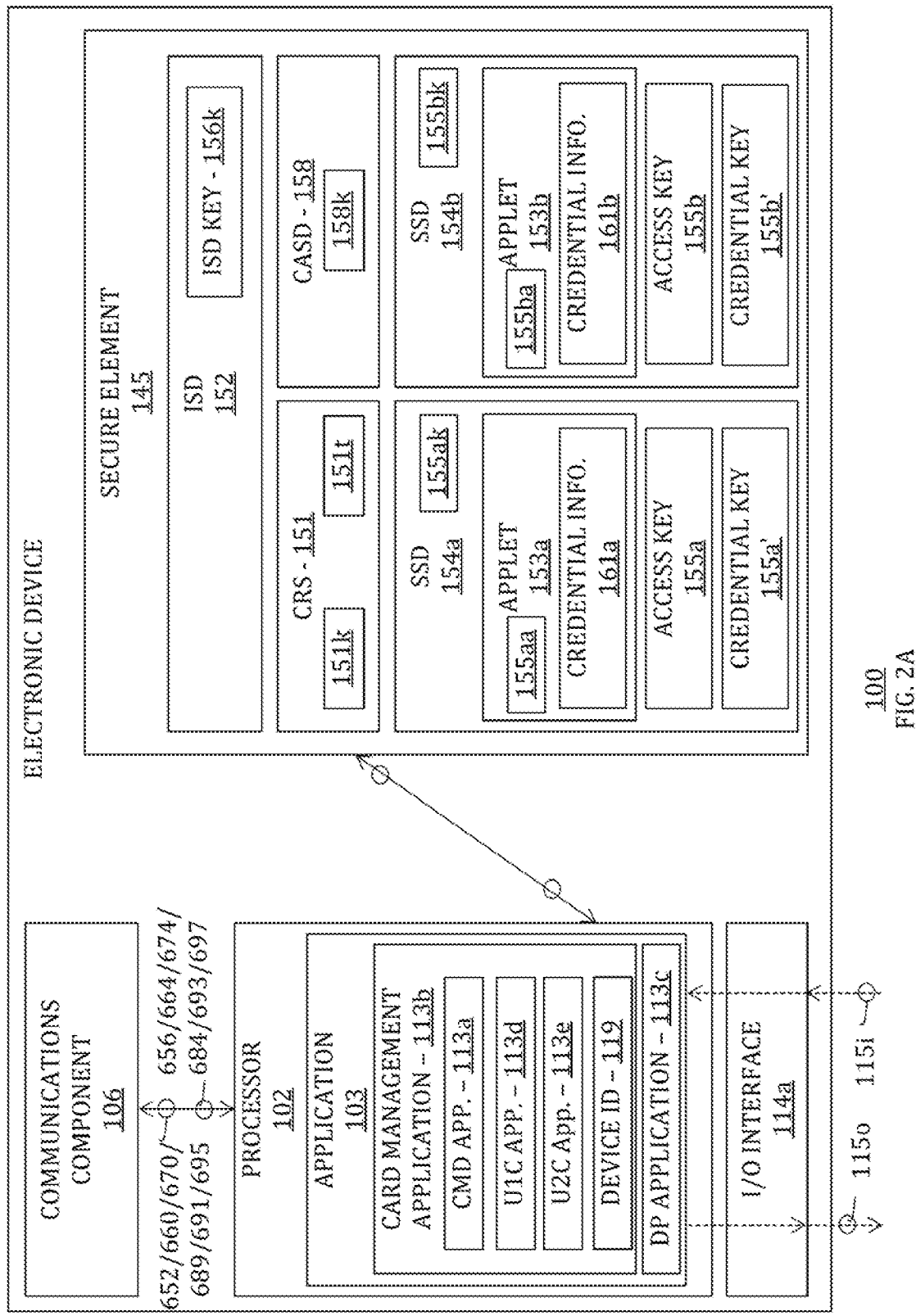
FIG. 2A is another more detailed schematic view of the electronic device of FIGS. 1-2.
Figure 3:
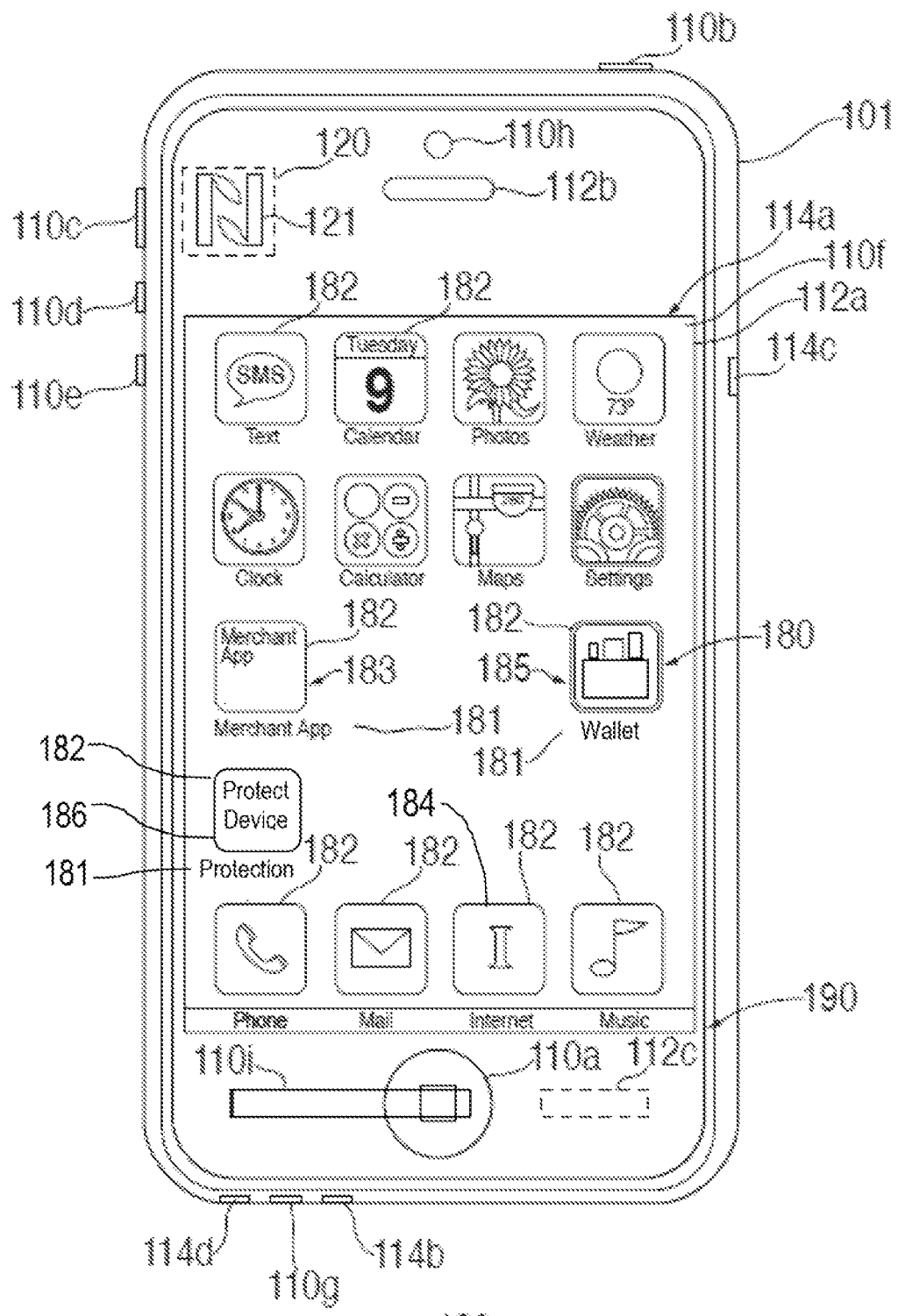
FIG. 3 is a front view of the electronic device of FIGS. 1-2A.

Description of FIG. 2. FIG. 2A, and FIG. 3

Referring now to FIG. 2, FIG. 2 shows a more detailed view of electronic device 100 of system 1. As shown in FIG. 2, for example, device 100 may include a processor 102, memory 104, communications component 106, power supply 108, input component 110, output component 112, antenna 116, and near field communication component 120. Device 100 may also include a bus 118 that may provide one or more wired or wireless communication links or paths for transferring data and/or power to, from, or between various other components of device 100. Device 100 may also be provided with a housing 101 that may at least partially enclose one or more of the components of device 100 for protection from debris and other degrading forces external to device 100. In some embodiments, one or more components of device 100 may be combined or omitted. Moreover, device 100 may include other components not combined or included in FIG. 2. For example, device 100 may include any other suitable components or several instances of the components shown in FIG. 2. For the sake of simplicity, only one of each of the components is shown in FIG. 2. Electronic device 100 may be any portable, mobile, or hand-held electronic device configured to store one or more transaction credentials for use in furthering a transaction with an SP subsystem. Alternatively, electronic device 100 may not be portable at all, but may instead be generally stationary. Electronic device 100 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc.), boom box, modem, router, printer, and combinations thereof.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., applications for implementing functions on device 100), firmware, preference information (e.g., media playback preferences), lifestyle information (e.g., food preferences), exercise information (e.g., information obtained by exercise monitoring equipment), transaction information, wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof. Communications component 106 may be operative to enable device 100 to communicate with one or more other electronic devices or servers or subsystems (e.g., one or more of subsystems 200, 300, and 400) using any suitable communications protocol(s) (e.g., wired and/or wireless protocol(s) via communications set-up 9). Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells). One or more input components 110 may be provided to permit a user or the ambient environment or data sources to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of device 100 may include any processing circuitry that may be operative to control the operations and performance of one or more components of device 100. For example, processor 102 may receive input signals from input component 110 and/or drive output signals through output component 112. Processor 102 of host device 100 may include any suitable processing circuitry that may be operative to control the operations and performance of one or more components of host device 100. As shown in FIG. 2, processor 102 may be used to run one or more applications (e.g., an application 103 and/or an application 113) that may at least partially dictate the way in which data may be received by, generated at, and/or communicated from device 100. As one example, application 103 may be an operating system application while application 113 may be a third party application or any other suitable online resource (e.g., a protection application associated with device protection subsystem 471 of AE subsystem 400, an application associated with a merchant of SP subsystem 200, etc.). Moreover, as shown, processor 102 may have access to a host device identification information 119, which may be utilized by a user of device 100 and/or AE subsystem 400 and/or issuer subsystem 300 and/or SP subsystem 200 for providing identification of device 100. As just one example, host device identification information 119 may be a telephone number or e-mail address or any unique identifier that may be associated with device 100 or a component thereof (e.g., a secure element of device 100).

Near field communication ("NFC") component 120 may be configured to communicate host transaction credential data and/or any other suitable data as a contactless proximity-based communication (e.g., near field communication) with SP subsystem 200 (e.g., with an SP NFC terminal of SP subsystem 200 that may be located at a brick and mortar store or any physical location at which a user of host device 100 may use a credential to conduct a transaction with a proximately located SP terminal via a contactless proximity-based communication). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. NFC component 120 may allow for close range communication at relatively high data rates (e.g., 370 Mbps), and may comply with any suitable standards, such as the TransferJet™ protocol. Communication between NFC component 120 and an NFC component of SP subsystem 200 may occur within any suitable close range distance between the NFC component and SP subsystem 200, such as a range of approximately 2 to 4 centimeters, and may operate at any suitable frequency (e.g., 13.56 MHz). For example, such close range communication of an NFC component may take place via magnetic field induction, which may allow the NFC component to communicate with other NFC devices and/or to retrieve information from tags having radio frequency identification ("RFID") circuitry. While NFC component 120 may be described with respect to near field communication, it is to be understood that component 120 may be configured to provide any suitable contactless proximity-based mobile payment or any other suitable type of contactless proximity-based communication between device 100 and another entity, such as a terminal of SP subsystem 200. For example, NFC component 120 may be configured to provide any suitable short-range communication, such as those involving electromagnetic/electrostatic coupling technologies.

NFC component 120 may include any suitable modules for enabling contactless proximity-based communication between device 100 and such an SP terminal. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to an SP terminal as part of a contactless proximity-based or NFC communication. NFC data module 132 may be configured to contain, route, or otherwise receive any suitable data that may be received by NFC component 120 from an SP terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between device 100 and an SP terminal. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communications between device 100 and SP subsystem 200. NFC memory module 150 may be tamper resistant and may provide at least a portion of a secure element 145 of device 100. For example, secure element 145 may be configured to provide a tamper-resistant platform (e.g., as a single-chip or multiple-chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of a credential issuer subsystem and/or a financial institution subsystem and/or an industry standard, such as GlobalPlatform).

As shown, for example, NFC memory module 150 may include one or more of an issuer security domain ("ISD") 152, one or more supplemental security domains ("SSDs") 154*a*-154*c* (e.g., a service provider security domain ("SPSD"), a trusted service manager security domain ("TSMSD"), credential SSD, access SSD, etc.), which may be defined and managed by an NFC specification standard (e GlobalPlatform). For example, ISD 152 may be a portion of NFC memory module 150 in which a trusted service manager ("TSM") or issuing financial institution (e.g., issuer subsystem 300) may store one or more keys (e.g., ISD key 156*k*) and/or other suitable information for creating or otherwise provisioning one or more credentials (e.g., credentials associated with various credit cards, bank cards, gift cards, access cards, transit passes, digital currency (e.g., bitcoin and associated payment networks), etc.) on device 100 (e.g., via communications component 106), for credential content management, and/or security domain management. A credential may include credential data (e.g., credential information 161*a*) that may be assigned to a user/consumer and that may be stored securely on electronic device 100, such as a credit card payment number (e.g., a device primary account number ("DPAN"), DPAN expiry date, CVV, etc. (e.g., as a token or otherwise)). NFC memory module 150 may include at least three SSDs 154 (e.g., first credential SSD 154*a*, second credential SSD 154*b*, and access SSD 154*c*). For example, each one of first credential SSD 154*a* and second credential SSD 154*b* may be associated with a respective specific credential (e.g., a specific credit card credential or a specific public transit card credential provisioned by issuer subsystem 300) that may provide specific privileges or payment rights to electronic device 100, while access SSD 154*c* may be associated with a commercial or administration entity (e.g., an entity of AE subsystem 400, which may be a controlling entity for device 100) that may control access of device 100 to a specific credential of another SSD (e.g., first SSD 154*a* or second SSD 154*b*), for example, to provide specific privileges or payment rights to electronic device 100. Each SSD 154 may include and/or be associated with at least one applet 153 (e.g., SSD 154*a* with applet 153*a* and SSD 154*b* with applet 153*b*). For example, an applet 153 of an SSD 154 may be an application that may run on a secure element of NFC component 120 (e.g., in a GlobalPlatform environment). A credential applet 153 may include or be associated with credential information 161 (e.g., information 161*a* of applet 153*a* and/or information 161*b* of applet 153*b*). Each SSD 154 and/or applet 153 may also include and/or be associated with at least one of its own keys 155 (e.g., applet 153*a* with at least one access key 155*a* and at least one credential key 155*a*′, and applet 153*b* with at least one access key 155*b* and at least one credential key 155*b*).

A key 155 of an SSD 154 may be a piece of information that can determine a functional output of a cryptographic algorithm or cipher. For example, in encryption, a key may specify a particular transformation of plaintext into cipher-text, or vice versa during decryption. Keys may also be used in other cryptographic algorithms, such as digital signature schemes and message authentication codes. A key of an SSD may provide any suitable shared secret with another entity. Each key and applet may be loaded on the secure element of device 100 by a TSM or an authorized agent or pre-loaded on the secure element when first provided on device 100. As one example, while credential SSD 154a may be associated with a particular credit card credential, that particular credential may only be used to communicate a host transaction credential data communication to SP subsystem 200 from a secure element of device 100 (e.g., from NFC component 120) for a financial transaction when applet 153a of that credential SSD 154a has been enabled or otherwise activated or unlocked for such use.

Security features may be provided for enabling use of NFC component 120 that may be particularly useful when transmitting confidential payment information, such as credit card information or bank account information of a credential, from electronic device 100 to SP subsystem 200 (e.g., via AE subsystem 400) and/or to electronic device 100 from issuer subsystem 300 (e.g., via AE subsystem 400). Such security features also may include a secure storage area that may have restricted access. For example, user authentication via personal identification number ("PIN") entry or via user interaction with a biometric sensor may need to be provided to access the secure storage area. As an example, access SSD 154c may leverage applet 153c to determine whether such authentication has occurred before allowing other SSDs 154 (e.g., credential SSD 154a or credential SSD 154b) to be used for communicating its credential information 161. In certain embodiments, some or all of the security features may be stored within NFC memory module 150. Further, security information, such as an authentication key, for communicating commerce credential data with SP subsystem 200 may be stored within NFC memory module 150. In certain embodiments, NFC memory module 150 may include a microcontroller embedded within electronic device 100. As just one example, applet 153c of access SSD 154c may be configured to determine intent and local authentication of a user of device 100 (e.g., via one or more input components 110, such as a biometric input component) and, in response to such a determination, may be configured to enable another particular SSD for conducting a payment transaction (e.g., with a credential of credential SSD 154a).

As shown in FIG. 2A, for example, secure element 145 of NFC component 120 may include SSD 154a, which may include or be associated with applet 153a, credential information 161a, access key 155a, and/or credential key 155a', and SSD 154b, which may include or be associated with applet 153b, credential information 161b, access key 155b, and/or credential key 155b'. In some embodiments, each one of SSDs 154a and 154b may be associated with a particular TSM and at least one specific commerce credential (e.g., a specific credit card credential or a specific public transit card credential) that may provide specific privileges or payment rights to electronic device 100 (e.g., SSD 154a may be associated with a first host transaction credential provisioned for first user U1 from first issuing subsystem 391 of issuer subsystem 300 and SSD 154b may be associated with a second host transaction credential provisioned for second user U2 from second issuing subsystem 392 of issuer subsystem 300, as mentioned with respect to FIG. 1). Each SSD 154 may have its own manager key 155 (e.g., a respective one of keys 155ak and 155bk) that may need to be activated to enable a function of that SSD 154 for use by NFC device module 130. Each SSD 154 may include and/or be associated with at least one of its own credential applications or credential applets (e.g., a Java card applet instances) associated with a particular commerce credential (e.g., credential applet 153a of SSD 154a may be associated with a first commerce credential and/or credential applet 153b of SSD 154b may be associated with a second commerce credential), where a credential applet may have its own access key (e.g., access key 155a for credential applet 153a and/or access key 155b for credential applet 153b) and/or its own credential key (e.g., credential key 155a' for credential applet 153a and/or credential key 155b' for credential applet 153b), and where a credential applet may need to be activated to enable its associated commerce credential for use by NFC device module 130 as an NFC communication (e.g., with an SP terminal) and/or as an online-based communication between device 100 and SP subsystem 200 (e.g., via AE subsystem 400).

A credential key of a credential applet may be generated by issuer subsystem 300 that may be responsible for such a credential and may be accessible by that issuer subsystem 300 for enabling secure transmission of that credential information of that applet between secure element 145 and issuer subsystem 300. An access key of a credential applet may be generated by AE subsystem 400 and may be accessible by AE subsystem 400 for enabling secure transmission of that credential information of that applet between secure element 145 and AE subsystem 400. As shown, each applet may include its own unique application identifier ("AID"), such as AID 155aa of applet 153a and/or AID 155ba of applet 153b. For example, an AID may identify a specific card scheme and product, program, or network (e.g., MasterCard Cirrus, Visa PLUS, Interac, etc.), where an AID may include not only a registered application provider identifier ("RID") that may be used to identify a payment system (e.g., card scheme) or network (e.g., MasterCard, Visa, Interac, etc.) of the credential associated with the AID but also a proprietary application identifier extension ("PIX") that may be used to differentiate between products, programs, or applications offered by a provider or payment system of the credential associated with the AID. Any suitable specification (e.g., a Java Card specification) that may be operative to preside over firmware of secure element 145 may be operative to ensure or otherwise force the uniqueness of each AID on secure element 145 (e.g., each credential instance on secure element 145 may be associated with its own unique AID).

As shown in FIG. 2A, secure element 145 may include ISD 152, which may include an ISD key 156k that may also be known to a trusted service manager associated with that security domain (e.g., AE subsystem 400, as shown in FIG. 1B). ISD key 156k may be leveraged by AE subsystem 400 and device 100 similarly to and/or instead of access key 155a and/or access key 155b for enabling secure transmissions between AE subsystem 400 and secure element 145. Moreover, as shown in FIG. 2A, various data may be communicated between processor 102 and secure element 145. For example, processor 102 of device 100 may be configured to run a device application 103 that may communicate information with an application 113 of processor 102 as well as secure element 145, an I/O interface component 114a (e.g., for receiving I/O input data 115i and/or for transmitting I/O output data 115o), and/or communications component 106. Moreover, as shown, processor 102 may have access to device identification information 119, which may be utilized for enabling secure communication between device 100 and remote entities.

As shown in FIG. 2A, secure element 145 may include a controlling authority security domain ("CASD") 158, which may be configured to generate and/or otherwise include CASD access kit 158k (e.g., CASD keys, certificates, and/or signing modules). For example, CASD 158 may be configured to sign certain data on secure element 145 (e.g., using CASD access kit 158k) before providing such data to another portion of device 100 (e.g., communications component 106 for sharing with other subsystems of system 1). Secure element 145 may include a contactless registry services ("CRS") applet or application 151 that may be configured to provide local functionality to electronic device 100 for modifying a life cycle state (e.g., activated, deactivated, suspended, locked, etc.) of certain security domain elements and sharing certain output information 115o about certain security domain elements in certain life cycle states with a user of device 100 (e.g., via a user I/O interface 114a), and may include a CRS list 151t that may maintain a list of the current life cycle state of each security domain element on secure element 145 and may be configured to share the life cycle state of one or more security domain elements with an application of device 100 (e.g., with any suitable application type, such as a daemon, such as card management daemon ("CMD") application 113a that may be running as a background process inside an operating system application 103 and/or a card management application 113b (e.g., a Passbook™ or Wallet™ application by Apple Inc.) and/or a device protection ("DP") application 113c (e.g., an application and/or daemon that may be associated with device protection subsystem 471 of AE subsystem 400) and/or a first user credential ("U1C") daemon or application 113d for use by first user U1 to communicate with secure element 145 and/or a second user credential ("U2C") daemon or application 113e for use by second user U2 to communicate with secure element 145), which in turn may provide certain life cycle state information to a user of device 100 as output information 115o via I/O interface 114a and a user interface ("UI") application (e.g., a UI of card management application 113b), which may enable a user to change a life cycle state of a security domain element. CRS 151 may include a CRS access key 151k that may also be known to a trusted service manager associated with CRS 151 (e.g., AE subsystem 400) and may be leveraged by AE subsystem 400 and device 100 similarly to and/or instead of access key 155a and/or access key 155b for enabling secure transmissions between AE subsystem 400 and secure element 145.

DP application 113c may be any suitable application type, such as a daemon, that may be running as a background process inside operating system application 103 and/or card management application 113b and/or that may be provided by CMD application 113a or that may be an application provided by any suitable entity (e.g., an entity responsible for device protection subsystem 471), and may be operative to enable any suitable device protection service(s) to be later activated by device protection subsystem 471 for protecting device 100 in one or more ways. For example, DP application 113c may be a "Find My Device" application (e.g., a "Find My iPhone" or "Find My Mac" application by Apple Inc.) that may be used in conjunction with a service of device protection subsystem 471 (e.g., an iCloud service of Apple Inc.) to track the location of device 100 and/or remotely control one or more functions of device 100, such as turn on an alarm and/or erase or suspend or otherwise terminate the usefulness of certain device content, such as suspend the ability for the secure element of device 100 to generate transaction credential data for use in furthering a transaction with a service provider. Such a service may be useful to a device owner when device 100 may be lost or stolen such that the device may be recovered and/or such that sensitive data on the device may not be accessed. Each one of U1C application 113d and U2C application 113e may be any suitable application type, such as a daemon, that may be running as a background process inside operating system application 103 and/or card management application 113b and/or that may be provided by CMD application 113a or that may be an application provided by any suitable entity (e.g., an entity responsible for credential protection subsystem 491), and may be operative to enable a particular user of device 100 to provision user transaction credentials on device 100 and/or otherwise manage one or more credentials for that user on device 100.

As shown in FIG. 3, a specific example of host electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected by a user of device 100, device 100 may launch or otherwise access a specific third party merchant or SP application and may display screens of a specific user interface that may include one or more tools or features for interacting with device 100 in a specific manner. As another example, when the specific icon 182 labeled with a "Wallet" textual indicator 181 (i.e., specific icon 185) is selected, device 100 may launch or otherwise access a specific device application (e.g., card management application 113b of FIG. 2A (e.g., as a "Wallet" or "Passbook" application) for managing various credentials on secure element 145) and may display screens of a specific user interface that may include one or more tools or features for interacting with device 100 in a specific manner. As another example, when the specific icon 182 labeled with a "Protection" textual indicator 181 (i.e., specific icon 186) is selected, device 100 may launch or otherwise access a specific device application (e.g., device protection application 113c of FIG. 2A (e.g., a "Find My Device" application)) for enabling certain device protection services to be activated (e.g., by device protection subsystem 471) for protecting device 100 (e.g., if lost, stolen, etc.). For each application, screens may be displayed on display output component 112a and may include various user interface elements. For each application, various other types of non-visual information may be provided to a user via various other output components 112 of device 100. In some embodiments, device 100 may not include a user interface component operative to provide a GUI but may instead be considered a more automated device. Device 100 may not include a user interface component operative to provide a GUI but may instead provide an audio and/or haptic output component and mechanical or other suitable user input components for selecting and authenticating use of a payment credential for funding a transaction.

SP subsystem 200 may include any suitable service provider ("SP") server (not shown), which may include any suitable component or subsystem configured to communicate any suitable data via any suitable communications protocol (e.g., Wi-Fi, Bluetooth™, cellular, wired network protocols, etc.) with a communications component of AE subsystem 400 and/or with communications component 106 of device 100. For example, an SP server may be operative to communicate potential transaction data with host device 100 within any suitable online-context, such as when a user of device 100 is communicating with the SP server to conduct a transaction via any suitable SP online resource that may be running on device 100, such as a third party SP application running on device 100 that may be managed by the SP server or an internet application (e.g., Safari™ by Apple Inc.) running on device 100 that may be pointed to a uniform resource locator ("URL") whose target or web resource may be managed by the SP server. Accordingly, it is noted that communications between an SP server and device 100 may occur wirelessly and/or via wired paths (e.g., over the internet). Such an SP server may be provided by a merchant or any other controlling entity of SP subsystem 200 (e.g., as a webserver to host website data and/or manage third party application data). Additionally or alternatively, SP subsystem 200 may include any suitable SP terminal (e.g., a merchant payment terminal), which may include any suitable component or subsystem configured to communicate any suitable data with a contactless proximity-based communication component of host device 100 (e.g., a contactless proximity-based communication with NFC component 120 of device 100). SP subsystem 200 may include one or more SP keys associated with SP subsystem 200 and/or any suitable service provider identification ("SP ID") information that may be utilized by device 100 and/or AE subsystem 400 and/or SP subsystem 200 and/or issuer subsystem 300 for uniquely identifying SP subsystem 200 to facilitate a transaction and/or to enable any suitable secure communication. As just one example, such SP ID information may be a telephone number or e-mail address or IP address or any unique identifier that may be associated with SP subsystem 200. Although not shown, SP subsystem 200 may also include an SP processor component that may be the same as or similar to a processor component 102 of electronic device 100, an SP communications component that may be the same as or similar to a communications component 106 of electronic device 100 (e.g., as a portion of an SP server), an SP I/O interface that may be the same as or similar to an I/O interface 114 of electronic device 100, an SP bus that may be the same as or similar to a bus 118 of electronic device 100, an SP memory component that may be the same as or similar to a memory component 104 of electronic device 100, and/or an SP power supply component that may be the same as or similar to a power supply component 108 of electronic device 100.

Issuer subsystem 300 may include at least one issuing subsystem (e.g., issuing bank subsystem), such as first issuing subsystem 391 and second issuing subsystem 392. Additionally, in some embodiments, issuer subsystem 300 may include at least one network subsystem (e.g., payment network subsystem (e.g., a payment card association or a credit card association)), such as first network subsystem and a second network subsystem. For example, each issuing subsystem may be a financial institution that may assume primary liability for a consumer's capacity to pay off debts they may incur with a specific credential. One or more specific credential applets of host device 100 may be associated with a specific payment card that may be electronically linked to an account or accounts of a particular user. Various types of payment cards may be suitable, including credit cards, debit cards, charge cards, stored-value cards, fleet cards, gift cards, and the like. The commerce credential of a specific payment card may be provisioned on host device 100 (e.g., as a credential of a credential supplemental security domain ("SSD") of NFC component 120, as described below) by an issuing subsystem of issuer subsystem 300 for use in a commerce credential data communication (e.g., a contactless proximity-based communication and/or an online-based communication) with SP subsystem 200 (e.g., directly or via AE subsystem 400). Each credential may be a specific brand of payment card that may be branded by a network subsystem of issuer subsystem 300. Each network subsystem of issuer subsystem 300 may be a network of various issuing subsystems of issuer subsystem 300 and/or various acquiring banks that may process the use of payment cards (e.g., commerce credentials) of a specific brand. Also known as a payment processor or acquirer, an acquiring bank subsystem may be a banking partner of the SP associated with SP subsystem 200, and the acquiring bank subsystem may be configured to work with issuer subsystem 300 to approve and settle credential transactions attempted to be funded by host device 100 with host transaction credential data (e.g., via SP subsystem 200). A network subsystem and an issuing subsystem of issuer subsystem 300 may be a single entity or separate entities. For example, American Express may be both a network subsystem and an issuing subsystem, while, in contrast, Visa and MasterCard may be payment subsystems and may work in cooperation with issuing subsystems, such as Citibank, Wells Fargo, Bank of America, and the like.

In order for a financial transaction to occur within system 1 (e.g., a particular type of the many suitable types of transactions that may be carried out by system 1 between host device 100 and SP subsystem 200 according to the concepts disclosed herein), at least one transaction credential must be securely provisioned on a secure element of host device 100. For example, such a transaction credential may be at least partially provisioned on secure element 145 of host device 100 directly from issuer subsystem 300 or via AE subsystem 400 (e.g., via credential protection subsystem 491). For example, first user credential data (e.g., data 656 of FIG. 6) may be provisioned from first issuing subsystem 391 on secure element 145 of device 100 for first user U1 as at least a portion or all of a credential supplemental security domain of NFC component 120 and may include a credential applet with credential information and/or a credential key, such as payment application or credential applet 153*a* with credential information 161*a* and credential key 155*a*', while second user credential data (e.g., data 664 of FIG. 6) may be provisioned from second issuing subsystem 392 on secure element 145 of device 100 for second user U2 as at least a portion or all of a credential supplemental security domain of NFC component 120 and may include a credential applet with credential information and/or a credential key, such as payment application or credential applet 153*b* with credential information 161*b* and credential key 155*b*'. Issuer subsystem 300 (e.g., first issuing subsystem 391) may also have access to credential key 155*a*' (e.g., for decrypting data encrypted by device 100 using credential key 155*a*'), and issuer subsystem 300 (e.g., second issuing subsystem 392) may also have access to credential key 155b' (e.g., for decrypting data encrypted by device 100 using credential key 155bc). Issuer subsystem 300 may be responsible for management of credentials key 155a' and 155b', which may include the generation, exchange, storage, use, and replacement of such keys. Issuer subsystem 300 may store its version of each credential key in one or more appropriate secure elements of issuer subsystem 300. It is to be understood that each one of credential keys 155a' and 155b' of NFC component 120 and of issuer subsystem 300 may be any suitable shared secret (e.g., a password, passphrase, array of randomly chosen bytes, one or more symmetric keys, public-private keys (e.g., asymmetric keys), etc.) available to both the secure element of electronic device 100 and issuer subsystem 300 that may be operative to enable any suitable crypto data (e.g., a cryptogram) or any other suitable data to be independently generated by electronic device 100 and issuer subsystem 300 (e.g., for validating payment data for a financial transaction), such as by using any suitable cryptographic algorithm or cipher whose functional output may be at least partially determined by the shared secret, where such a shared secret may be provisioned on device 100 by issuer subsystem 300. A shared secret may either be shared beforehand between issuer subsystem 300 and host device 100 (e.g., during provisioning of a credential on device 100 by issuer subsystem 300), in which case such a shared secret may be referred to as a pre-shared key, or a shared secret may be created prior to use for a particular financial transaction by using a key-agreement protocol (e.g., using public-key cryptography, such as Diffie-Hellman, or using symmetric-key cryptography, such as Kerberos). The shared secret and any suitable cryptographic algorithm or cipher whose functional output may be at least partially determined by the shared secret may be accessible to the secure element of device 100.

AE subsystem 400 (e.g., credential protection subsystem 491) may be provided as an intermediary between issuer subsystem 300 and host device 100, where AE subsystem 400 may be configured to provide a new layer of security and/or to provide a more seamless user experience when a credential is being provisioned on device 100 and/or when such a provisioned credential is being used as part of a host transaction credential data communication between device 100 and SP subsystem 200. AE subsystem 400 may be provided by any suitable administration and/or commercial entity that may offer various services to a user of device 100 via user-specific log-in information to a user-specific account with that administration entity (e.g., via user-specific identification and password combinations). As just one example, AE subsystem 400 may be provided by Apple Inc. of Cupertino, Calif., which may also be a provider of various administration and/or other services to users of device 100 (e.g., the iTunes™ Store for selling/renting media to be played by device 100, the Apple App Store™ for selling/renting applications for use on device 100 (e.g., store 420 for securely delivering applications to device 100), the Apple iCloud™ Service (e.g., a service of device protection subsystem 471) for storing data from device 100 and/or associating a user with a device and/or providing device protection services (e.g., using DP application 113c on device 100), the Apple Online Store for buying various Apple products online, the Apple iMessage™ Service for communicating media messages between devices, the Apple Pay™ Service (e.g., a service of credential protection subsystem 491) for securing and managing credential provisioning on device 100 and/or securely using host device credential data for furthering a transaction with a service provider, etc.), and which may also be a provider, manufacturer, and/or developer of device 100 itself and/or device 100' itself (e.g., when device 100 is an iPod™, iPad™, iPhone™, MacBook™, iMac™, Apple Watch™, or the like) and/or of an operating system (e.g., device application 103) or any other application (e.g., card management application 113b and/or DP application 113c) of device 100. The administration or commercial entity that may provide AE subsystem 400 (e.g., Apple Inc.) may be distinct and independent from any credential issuing and/or financial entity of issuer subsystem 300. For example, the administration or commercial entity that may provide AE subsystem 400 may be distinct and/or independent from any payment network subsystem or issuing bank subsystem that may furnish and/or manage any credit card or any other transaction credential to be provisioned on end-user host device 100. The entity that may provide AE subsystem 400 (e.g., Apple Inc.) may be distinct and independent from any merchant of SP subsystem 200 (e.g., any SP entity of SP subsystem 200 that may provide an SP terminal for NFC communications, a third party application for online communications, and/or any other aspect of SP subsystem 200). Such an administration entity may leverage its potential ability to configure or control various components of device 100 (e.g., software and/or hardware components of device 100, such as when that entity may at least partially produce or manage device 100) in order to provide a more seamless user experience for a user of device 100 when he or she wants to provision a credential offered by issuer subsystem 300 on host device 100 and/or when such a provisioned credential is being used as part of a host transaction credential data communication with SP subsystem 200 to fund a transaction and/or when device 100 may have any device protection services enabled (e.g., via DP application 113c) for facilitating any suitable device protection services by device protection subsystem 471. For example, in some embodiments, device 100 may be configured to communicate with AE subsystem 400 seamlessly and transparently to a user of device 100 for sharing and/or receiving certain data that may enable a higher level of security (e.g., during an online-based host transaction credential data communication between device 100 and SP subsystem 200 and/or when device 100 has been reported as lost or stolen). Although not shown, AE subsystem 400 may also include or have access to a processor component, a communications component, an I/O interface, a bus, a memory component, and/or a power supply component that may be the same as or similar to such components of device 100, one, some or all of which may be at least partially provided by one, some, or each one of device protection subsystem 471 and credential protection subsystem 491 of AE subsystem 400.

In addition to at least one transaction credential being provisioned on host device 100 (e.g., a first user credential as a portion of a first credential SSD 154a with credential key 155a' and credential information 161a and/or a second user credential as a portion of a second credential SSD 154b with credential key 155b' and credential information 161b), at least one access SSD 154c with an access key 155c may also be provisioned on device 100 in order to more securely enable device 100 to conduct a financial or other secure transaction with SP subsystem 200. For example, access data may be provisioned on device 100 as at least a portion of access SSD 154c directly from AE subsystem 400 and may include an access applet 153c with access key 155c. AE subsystem 400 (e.g., credential protection subsystem 491) may also have access to access key 155c (e.g., for decrypting data encrypted by device 100 using access key 155c). AE subsystem 400 may be responsible for management of access key 155c, which may include the generation, exchange, storage, use, and replacement of such a key. AE subsystem 400 may store its version of access key 155c in a secure element of AE subsystem 400. Access SSD 154c with access key 155c may be configured to determine intent and local authentication of a user of device 100 (e.g., via one or more input components 110 of device 100, such as a biometric input component) and, in response to such a determination, may be configured to enable another particular SSD for conducting a payment transaction (e.g., with a user credential of credential SSD 154a or SSD 154b). By storing such an access SSD within secure element 145 of device 100, its ability to reliably determine user intent for and authentication of a secure data transaction may be increased. Moreover, access key 155c may be used to provide increased encryption to any transaction credential data that may be communicated outside of the secure element of device 100. Access data may include an issuer security domain ("ISD") key 156k for an ISD 152 of secure element 145, which may also be maintained by AE subsystem 400, and may be used in addition to or as an alternative to access key 155c (or one or more other ones of access keys 155a, 155b, 151k, and 158k).

Figure 4:
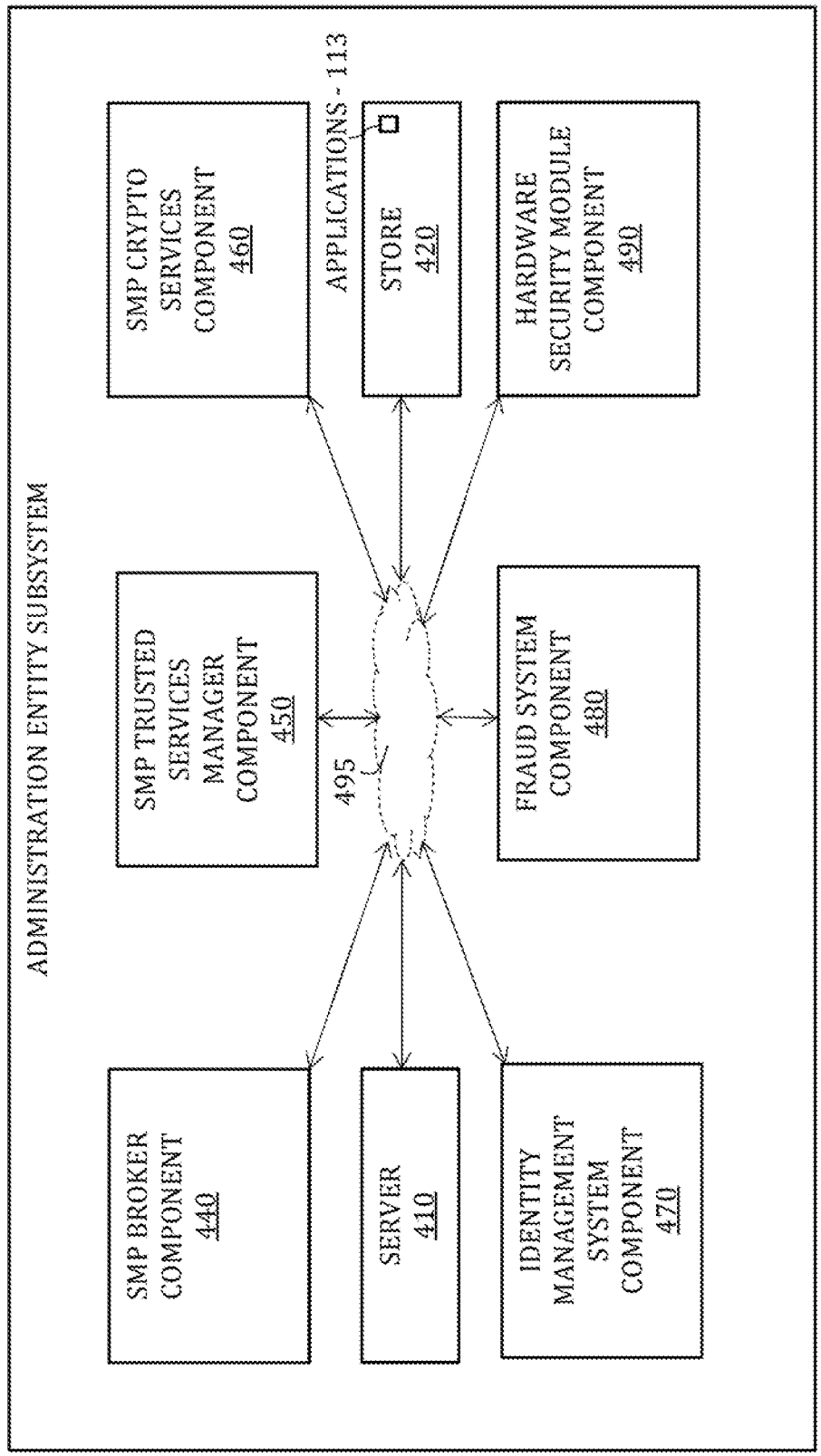
FIGS. 4, 4A, and 4B are more detailed schematic views of an administration entity subsystem of the system of FIG. 1.

Description of FIG. 4

FIG. 4 shows further details with respect to various embodiments of AE subsystem 400 of system 1. As shown in FIG. 4, AE subsystem 400 may be a secure platform system and may include a server 410, an online store 420, secure mobile platform ("SMP") broker component 440, an SMP trusted services manager ("TSM") component 450, an SMP crypto services component 460, an identity management system ("IDMS") component 470, a fraud system component 480, and/or a hardware security module ("HSM") component 490. In some embodiments, one or more components of AE subsystem 400 may be combined or omitted. Moreover, AE subsystem 400 may include other components not combined or included in FIG. 4. For example, AE subsystem 400 may include any other suitable components or several instances of the components shown in FIG. 4. For the sake of simplicity, only one of each of the components is shown in FIG. 4. One, some, or all components of AE subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of AE subsystem 400 may be managed by, owned by, at least partially controlled by, and/or otherwise provided by a single administration or commercial entity (e.g., Apple Inc.) that may be distinct and independent from issuer subsystem 300. The components of AE subsystem 400 may interact with each other and collectively with issuer subsystem 300 and/or host electronic device 100 and/or SP subsystem 200 for providing a new layer of security and/or for providing a more seamless user experience. In some embodiments, device protection subsystem 471 and credential protection subsystem 491 may each include its own processing component, memory component, communications component, store 420, SMP broker component 440, SMP TSM component 450, SMP crypto services component 460, IDMS component 470, fraud system component 480, and/or HSM component 490.

SMP broker component 440 of AE subsystem 400 may be configured to manage user authentication with an administration or commercial entity user account. SMP broker component 440 may also be configured to manage the lifecycle and provisioning of credentials on device 100. SMP broker component 440 may be a primary end point that may control the user interface elements (e.g., elements of GUI 180) on device 100. An operating system or other application of an end user device (e.g., application 103, application(s) 113, and/or application 143 of host device 100) may be configured to call specific application programming interfaces ("APIs") and SMP broker 440 may be configured to process requests of those APIs and respond with data that may derive the user interface of device 100 and/or respond with application protocol data units ("APDUs") that may communicate with secure element 145 of device 100. Such APDUs may be received by AE subsystem 400 from issuer subsystem 300 via a TSM of system 1 (e.g., a TSM of a communication path between AE subsystem 400 and issuer subsystem 300). SMP TSM component 450 of AE subsystem 400 may be configured to provide GlobalPlatform-based services or any other suitable services that may be used to carry out credential provisioning operations on device 100 from issuer subsystem 300. GlobalPlatform, or any other suitable secure channel protocol, may enable SMP TSM component 450 to properly communicate and/or provision sensitive account data between secure element 145 of device 100 and a TSM for secure data communication between AE subsystem 400 and issuer subsystem 300.

SMP TSM component 450 may be configured to use HSM component 490 to protect its keys and generate new keys. SMP crypto services component 460 of AE subsystem 400 may be configured to provide key management and cryptography operations that may be provided for user authentication and/or confidential data transmission between various components of system 1. SMP crypto services component 460 may utilize HSM component 490 for secure key storage and/or opaque cryptographic operations. A payment crypto service of SMP crypto services component 460 may be configured to interact with IDMS component 470 to retrieve information associated with on-file credit cards or other types of commerce credentials associated with user accounts of the administration entity. IDMS component 470 may be configured to enable and/or manage any suitable communication between host device 100 and one or more other devices, such as an identity services ("IDS") transport (e.g., using an administration-entity specific (or other entity specific) service (e.g., iMessage™ by Apple Inc.)). For example, certain devices may be automatically or manually registered for such a service (e.g., all devices in an ecosystem of AE subsystem 400 may be automatically registered for the service). Such a service may provide an end-to-end encrypted mechanism that may require active registration before messages can be sent using the service. IDMS component 470 and/or any other suitable server or portion of AE subsystem 400 may be operative to identify or otherwise lookup the status of any credentials provisioned on any electronic devices associated with a given user account or otherwise, such that AE subsystem 400 may be operative to efficiently and effectively identify one or more payment credentials that may be available to a particular device associated with a particular user account (e.g., multiple host devices of a family account with AE subsystem 400). Fraud system component 480 of AE subsystem 400 may be configured to run an administration entity fraud check on a transaction credential based on data known to the administration entity about the transaction credential and/or the user (e.g., based on data (e.g., transaction credential information) associated with a user account with the administration entity and/or any other suitable data that may be under the control of the administration entity and/or any other suitable data that may not be under the control of issuer subsystem 300). Fraud system component 480 may be configured to determine an administration entity fraud score for the credential based on various factors or thresholds. AE subsystem 400 may include store 420, which may be a provider of various services to users of device 100 (e.g., the iTunes™ Store for selling/renting media to be played by device 100, the Apple App Store™ for selling/renting applications for use on device 100, etc.). As just one example, store 420 may be configured to manage and provide an application 113 to device 100, where application 113 may be any suitable application, such as a banking application, an SP application, an e-mail application, a text messaging application, an internet application, a card management application, a device protection application, or any other suitable communication application. Server 410 may be used to store and/or process any suitable data. For example, a server of device protection subsystem 471 may access and process any suitable data of table or data structure 473, while a server of credential protection subsystem 491 may access and process any suitable data of table or data structure 493. Any suitable communication protocol or combination of communication protocols may be used by a communications set-up 495 of AE subsystem 400 to communicate data amongst the various components of AE subsystem 400 and/or to communicate data between AE subsystem 400 and other components of system 1 (e.g., issuer subsystem 300 and/or host device 100 and/or SP subsystem 200 (e.g., via communications set-up 9)).

Description of FIG. 5

FIG. 5 is a flowchart of an illustrative process 500 for managing a plurality of credentials on an electronic device using an administration entity subsystem including a device protection server and a credential protection server, wherein the electronic device is associated with a device identifier and is used by a first user associated with a first user identifier and by a second user associated with a second user identifier (e.g., using AE subsystem 400 including device protection subsystem 471 and credential protection subsystem 491). At operation 502, when the first user authenticates the provisioning of a first credential of the plurality of credentials on the electronic device, the credential protection server may be used to store, at the credential protection server, a first suspension token against the device identifier and against the first user identifier and against a first credential identifier of the first credential, and to provision the first credential and the first suspension token on the electronic device (e.g., as described with respect to FIG. 6, credential protection subsystem 491 may store a first suspension token ST-1 against a device identifier ED-ID and against a first user identifier U1-ID and against a first credential identifier C1-ID, and may provision first user credential data 658 including first suspension token ST-1 on device 100). At operation 504, when the second user authenticates the provisioning of a second credential of the plurality of credentials on the electronic device, the credential protection server may be used to store, at the credential protection server, a second suspension token against the device identifier and against the second user identifier and against a second credential identifier of the second credential, and to provision the second credential and the second suspension token on the electronic device (e.g., as described with respect to FIG. 6, credential protection subsystem 491 may store a second suspension token ST-2 against device identifier ED-ID and against a second user identifier U2-ID and against a second credential identifier C2-ID, and may provision second user credential data 664 including second suspension token ST-2 on device 100). At operation 506, when the second user enables a protection service of the electronic device on the electronic device, the device protection server may be used to store, at the device protection server, the first suspension token and the second suspension token against the device identifier and against the second user identifier (e.g., as described with respect to FIG. 6, device protection subsystem 471 may store first suspension token ST-1 and second suspension token ST-2 against device identifier ED-ID and against second user identifier U2-ID). At operation 508, when a protection mode is activated for the protection service of the electronic device enabled by the second user, the device protection server may be used to authenticate the second user using the second user identifier and to identify each one of the first suspension token and the second suspension token as stored at the device protection server against the device identifier of the electronic device and against the second user identifier and to share each one of the identified first suspension token and the identified second suspension token with the credential protection server (e.g., as described with respect to FIG. 6, device protection subsystem 471 may authenticate second user U2 using second user identifier U2-ID, identify ST-1 and ST-2 as stored against ED-ID and U2-ID, and share ST-1 and ST-2 with credential protection server 491). At operation 510, when each one of the identified first suspension token and the identified second suspension token is shared by the device protection server with the credential protection server, the credential protection server may be used to suspend each credential of the plurality of credentials that is stored at the credential protection server against the identified first suspension token and to suspend each credential of the plurality of credentials that is stored at the credential protection server against the identified second suspension token (e.g., as described with respect to FIG. 6, credential protection subsystem 491 may suspend each credential stored against ST-1 and to suspend each credential stored against ST-2). At operation 512, when the second user authenticates the second user on the electronic device using the second user identifier while the second credential is suspended, the credential protection server may be used to authenticate the second user using the second user identifier from the electronic device and unsuspend each credential of the plurality of credentials that has a credential identifier stored at the credential protection server against the second user identifier (e.g., as described with respect to FIG. 6, credential protection subsystem 491 may authenticate second user U2 using second user identifier U2-ID and unsuspend each credential that has a credential identifier stored against U2-ID).

It is understood that the operations shown in process 500 of FIG. 5 are only illustrative and that existing operations may be modified or omitted, additional operations may be added, and the order of certain operations may be altered. Further, in some implementations, two or more operations may occur in parallel or in a different sequence than described.

Figure 6:
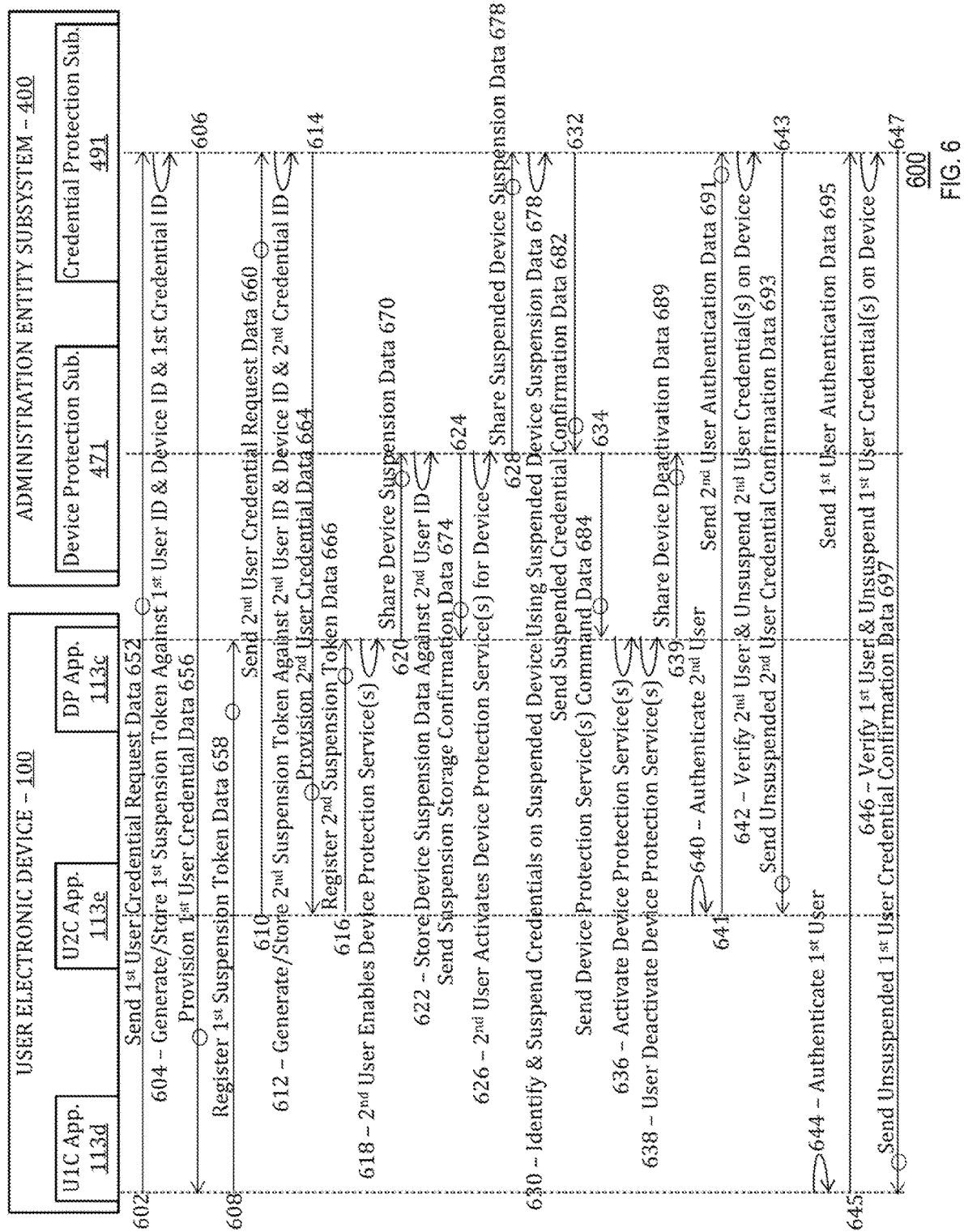

Description of FIG. 6

Figure 4A:
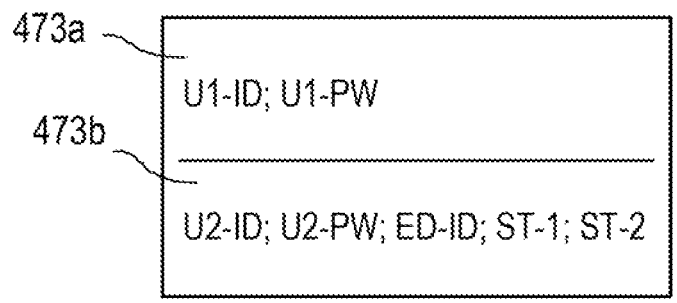

FIG. 6 is a flowchart of an illustrative process 600 for managing credentials of multiple users on an electronic device. Process 600 is shown being implemented by host device 100 and AE subsystem 400. However, it is to be understood that process 600 may be implemented using any other suitable components or subsystems. Process 600 may provide a seamless user experience for securely and efficiently managing credentials of multiple users on electronic device 100 using device protection subsystem 471 and credential protection subsystem 491 of AE subsystem 400 while limiting the potential for privacy and/or security breaches by preventing device protection subsystem 471 from storing information at device protection subsystem 471 that may specifically link two or more particular users to device 100. To facilitate the following discussion regarding the operation of system 1 for managing credentials of multiple users on an electronic device according to process 600 of FIG. 6, reference is made to various components of system 1 of the schematic diagrams of FIGS. 1-4 and to the content of data structures 473 and 493 of FIGS. 4A and 4B.

At operation 602, device 100 (e.g., U1C application 113d) may send first user credential request data 652 to credential protection subsystem 491 that may be operative to request that one or more first user transaction credentials be provisioned on device 100 for first user U1. For example, operation 602 may be at least partially carried out when first user U1 of device 100 selects a particular first user transaction credential of credential issuer subsystem 300 (e.g., of first issuing subsystem 391) to be provisioned on device 100 (e.g., by interacting with device 100 in any suitable manner). First user credential request data 652 may include any suitable identification of the first user transaction credential to be provisioned (e.g., at least a portion of a primary account number ("PAN"), PAN expiry date, CV V, etc.), a first user identifier U1-ID that may be any suitable data that may uniquely identify first user U1 to AE subsystem 400 and/or any suitable first user password data U1-PW associated therewith (e.g., user-specific log-in information to a user-specific account with that administration entity (e.g., via user-specific identification and password combinations)), an electronic device identifier ED-ID that may be any suitable data that may uniquely identify electronic device 100 to AE subsystem 400 (e.g., device ID 119, etc.), and/or the like.

Figure 4B:
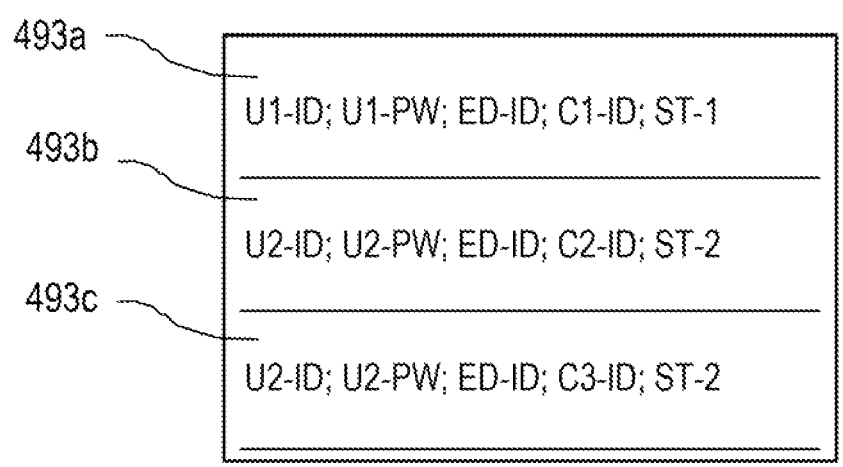

At operation 604, credential protection subsystem 491, for example, in conjunction with credential issuer subsystem 300, may be operative to process first user credential request data 652, to obtain credential information from credential issuer subsystem 300 to be provisioned on device 100 for first user U1 based on first user credential request data 652 (e.g., based on the identification of the first user transaction credential), to determine (e.g., generate and/or obtain) a first user transaction credential identifier C1-ID that may uniquely identify that first user transaction credential to AE subsystem 400, to access (e.g., generate and/or obtain) a first suspension token ST-1 that be unique to AE subsystem 400, and then to store first suspension token ST-1 against first user transaction credential identifier C1-ID and/or electronic device identifier ED-ID and/or first user identifier U1-ID and/or first user password data U1-PW (e.g., by linking such data with any suitable data link(s)) in any suitable memory component of credential protection subsystem 491, such as in a first linked data entry 493a of table 493 of FIGS. 1 and 4B. Such a unique first suspension token ST-1 may be any suitable data element of any suitable size, such as an 8- or 9-character alphanumeric string that may be randomly or uniquely generated by AE subsystem 400 or otherwise for association with any suitable data indicative of first user U1 and/or each first user transaction credential of device 100, yet such that first suspension token ST-1 may not be associated with another user of device 100 (e.g., with second user U2).

At operation 606, first suspension token ST-1 may be communicated to device 100 (e.g., to U1C application 113d) with credential information from credential issuer subsystem 300 for provisioning on device 100 as first user credential data 656. For example, at least the credential information of such first user credential data 656 may be at least partially provisioned on secure element 145 of device 100 directly from credential issuer subsystem 300 (not shown in FIG. 6) or via credential protection subsystem 491 along with first suspension token ST-1. As mentioned, such first user transaction credential information of first user credential data 656 may be provisioned on secure element 145 of device 100 as at least a portion or all of first credential SSD 154a and may include credential applet 153a with credential information 161a and/or credential key 155a' and/or key 155ak. First user credential data 656 may also include access key 155a, which may be initially provided from AE subsystem 400 to issuer subsystem 300 and/or may be added by AE subsystem 400. In some embodiments, such first user transaction credential information of first user credential data 656 may include the primary account number as at least a portion of credential information of a payment credential being provisioned (e.g., credential information 161a of applet 153a), an AID (e.g., AID 155aa for applet 153a of the data of the payment credential being provisioned at SSD 154a), an SSD identifier, and/or an SSD counter. At operation 608, in response to receiving first user credential data 656 with first suspension token ST-1, device 100 (e.g., U1C application 113d) may register first suspension token ST-1 with DP application 113c as at least a portion of first suspension token data 658. First suspension token ST-1 of first suspension token data 658 may be stored in any suitable register or data structure available to DP application 113c (e.g., in any suitable portion of memory 104 of device 100 (e.g., using Keychain of Apple Inc.)).

Later, after first user U1 may have interacted with device 100 (e.g., at operation 602) for provisioning at least one first user transaction credential on device 100, second user U2 may log-into device 100 as an active user. Then, at operation 610, device 100 (e.g., U2C application 113e) may send second user credential request data 660 to credential protection subsystem 491 that may be operative to request that one or more second user transaction credentials be provisioned on device 100 for second user U2. For example, operation 610 may be at least partially carried out when second user U2 of device 100 selects a particular second user transaction credential of credential issuer subsystem 300 (e.g., of first issuing subsystem 391 or of second issuing subsystem 392) to be provisioned on device 100 (e.g., by interacting with device 100 in any suitable manner). Second user credential request data 660 may include any suitable identification of the second user transaction credential to be provisioned (e.g., at least a portion of a primary account number ("PAN"), PAN expiry date, CVV, etc.), a second user identifier U2-ID that may be any suitable data that may uniquely identify second user U2 to AE subsystem 400 and/or any suitable second user password data U2-PW associated therewith (e.g., user-specific log-in information to a user-specific account with that administration entity (e.g., via user-specific identification and password combinations)), electronic device identifier ED-ID that may be any suitable data that may uniquely identify electronic device 100 to AE subsystem 400 (e.g., device ID 119, etc.), and/or the like.

At operation 612, credential protection subsystem 491, for example, in conjunction with credential issuer subsystem 300, may be operative to process second user credential request data 660, to obtain credential information from credential issuer subsystem 300 to be provisioned on device 100 for second user U2 based on second user credential request data 660 (e.g., based on the identification of the second user transaction credential), to determine (e.g., generate and/or obtain) a second user transaction credential identifier C2-ID that may uniquely identify that second user transaction credential to AE subsystem 400, to access (e.g., generate and/or obtain) a second suspension token ST-2 that be unique to AE subsystem 400, and then to store second suspension token ST-2 against second user transaction credential identifier C2-ID and/or electronic device identifier ED-ID and/or second user identifier U2-ID and/or second user password data U2-PW (e.g., by linking such data with any suitable data link(s)) in any suitable memory component of credential protection subsystem 491, such as in a second linked data entry 493b of table 493 of FIGS. 1 and 4B. Such a unique second suspension token ST-2 may be any suitable data element of any suitable size, such as an 8- or 9-character alphanumeric string that may be randomly or uniquely generated by AE subsystem 400 or otherwise for association with any suitable data indicative of second user U2 and/or each second user transaction credential of device 100, yet such that second suspension token ST-2 may not be associated with another user of device 100 (e.g., with first user U1).

At operation 614, second suspension token ST-2 may be communicated to device 100 (e.g., to U2C application 113e) with credential information from credential issuer subsystem 300 for provisioning on device 100 as second user credential data 664. For example, at least the credential information of such second user credential data 664 may be at least partially provisioned on secure element 145 of device 100 directly from credential issuer subsystem 300 (not shown in FIG. 6) or via credential protection subsystem 491 along with second suspension token ST-2. As mentioned, such second user transaction credential information of second user credential data 664 may be provisioned on secure element 145 of device 100 as at least a portion or all of second credential SSD 154b and may include credential applet 153b with credential information 161b and/or credential key 155b' and/or key 155bk. Second user credential data 664 may also include access key 155b, which may be initially provided from AE subsystem 400 to issuer subsystem 300 and/or may be added by AE subsystem 400. In some embodiments, such second user transaction credential information of second user credential data 664 may include the primary account number as at least a portion of credential information of a payment credential being provisioned (e.g., credential information 161b of applet 153b), an AID (e.g., AID 155ba for applet 153b of the data of the payment credential being provisioned at SSD 154b), an SSD identifier, and/or an SSD counter. At operation 616, in response to receiving second user credential data 664 with second suspension token ST-2, device 100 (e.g., U2C application 113e) may register second suspension token ST-2 with DP application 113c as at least a portion of second suspension token data 666. Second suspension token ST-2 of second suspension token data 66 may be stored in any suitable register or data structure available to DP application 113c (e.g., in any suitable portion of memory 104 of device 100 (e.g., using Keychain of Apple Inc.)).

At any suitable time during process 600 prior to operation 626 at which a user of device 100 may activate one or more device protection services for device 100 at device protection subsystem 471, any suitable user of device 100 may enable one or more device protection services for device 100 using DP application 113c on device 100. For example, as shown in FIG. 6, second user U2, while logged-in to device 100, may be operative to interact with device 100 in any suitable manner for enabling one or more device protection services of DP application 113c at operation 618. For example, at operation 618, second user U2 may interact with DP application 113c to enable a "Find My Device" option facilitated by DP application 113c, which may then configure DP application 113c to enable device protection subsystem 471 to remotely instruct DP application 113c to activate one or more device protection services on device 100, such as turn on an alarm and/or erase or suspend or otherwise terminate the usefulness of certain device content (e.g., as described with respect to operations 634 and 636). When a particular user has interacted with device 100 for enabling one or more device protection services of DP application 113c (e.g., at operation 618), DP application 113c may be operative to share device suspension data 670 with device protection subsystem 471 at operation 620 indicative of any suspension tokens that have been registered on device 100 by DP application 113c. For example, in some embodiments, device suspension data 670 may include first suspension token ST-1, second suspension token ST-2, electronic device identifier ED-ID, and identification of the second user U2 that has enabled one or more device protection services of DP application 113c, such as second user identifier U2-ID and/or second user password data U2-PW. Alternatively, if second user U2 enables the device protection service(s) of DP application 113c prior to a suspension token being provisioned on device 100 and registered at DP application 113c (e.g., if operation 618 were to occur prior to operations 602-616), then DP application 113c may be configured to communicate appropriate device suspension data to device protection subsystem 471 each time a suspension token is registered at DP application 113c (e.g., device suspension data that may include each suspension token registered at DP application 113c, device identifier ED-ID, and identification of the user that enabled the device protection services).

Continuing with the example of FIG. 6, when device suspension data 670 may be shared by DP application 113c with device protection subsystem 471 at operation 620 with data indicative of first suspension token ST-1, second suspension token ST-2, electronic device identifier ED-ID, and identification of the second user U2 that has enabled one or more device protection services of DP application 113c, such as second user identifier U2-ID and/or second user password data U2-PW, then device protection subsystem 471 may be operative to process such device suspension data 670 and register at least a portion of that device suspension data at device protection subsystem 471 at operation 622. For example, at operation 622, device protection subsystem 471 may be operative to validate any suitable information associated with the user that has enabled one or more device protection services of DP application 113c, such as by validating or otherwise authenticating second user identifier U2-ID and second user password data U2-PW of device suspension data 670 by comparing such data with user-specific account information already available to AE subsystem 400 and, if user U2 may be authenticated, then device protection subsystem 471 may be operative to store each suspension token of device suspension data 670 (e.g., first suspension token ST-1 and second suspension token ST-2) against electronic device identifier ED-ID and/or second user identifier U2-ID and/or second user password data U2-PW (e.g., by linking such data with any suitable data link(s)) in any suitable memory component of device protection subsystem 471, such as in a second linked data entry 473b of table 473 of FIGS. 1 and 4A (e.g., where a first linked data entry 473a of table 473 may at least include the user-specific account information already available to AE subsystem 400 for first user U1 (e.g., information that may be used to authenticate first user U1 in case first user U1 was the user that had enabled one or more device protection services of DP application 113c)). Then, once device suspension data 670 has been processed and stored against identification of the user that has most recently enabled the device protection service(s) of DP application 113c (e.g., second user U2) at operation 622, device protection subsystem 471 may be operative to generate and communicate any suitable suspension storage confirmation data 674 to device 100 (e.g., to DP application 113c) at operation 624 that may confirm to device 100 that each suspension token of device 100 has been properly registered with device protection subsystem 471 against the user that has most recently enabled the device protection service(s) of DP application 113c.

Therefore, while data entry 473b of table 473 may include data linking first suspension token ST-1 and second suspension token ST-2 and second user U2 with electronic device 100, table 473 of device protection subsystem 471 may not include sensitive data linking both first user U1 and second user U2 to electronic device 100. In some embodiments, any storage of new suspension data for device 100 at device protection subsystem 471 at operation 622 in response to receiving new device suspension data at operation 620 from device 100 may first include clearing any previously stored suspension data at device protection subsystem 471 for device 100. For example, if after operation 616 but prior to operations 618-624, first user U1 had enabled the device protection service(s) of DP application 113c and appropriate device suspension data had been shared with device protection subsystem 471 for storing each suspension token (e.g., first suspension token ST-1 and second suspension token ST-2) against electronic device identifier ED-ID and/or first user identifier U1-ID and/or first user password data U1-PW (e.g., by linking such data with any suitable data link(s)) in any suitable memory component of device protection subsystem 471, such as in first linked data entry 473a of table 473 of FIGS. 1 and 4A (e.g., in an earlier iteration of operations 618-622 initiated by a first user), then later operations 618-622 may be operative to first clear such a link between first user U1 and device 100 and suspension tokens ST-1 and ST-2 at device protection subsystem 471 (e.g., delete at least ED-ID and ST-1 and ST-2 from data entry 473a of table 473 prior to storing the linking data of ED-ID and ST-1 and ST-2 with U2-ID and U2-PW in data entry 473b of table 473) prior to storage of the new suspension data linking second user U2 and device 100 to suspension tokens ST-1 and ST-2 in order to ensure that table 473 of device protection subsystem 471 may not include sensitive data linking both first user U1 and second user U2 to electronic device 100 and/or to suspension tokens ST-1 and ST-2.

Continuing with the example of FIG. 6, at any suitable time after device suspension data 670 has been processed and stored against identification of the user that has most recently enabled the device protection service(s) of DP application 113c (e.g., second user U2) at operation 622 and any appropriate suspension storage confirmation data 674 has been communicated to device 100 at operation 624, the user that has most recently enabled the device protection service(s) of DP application 113c (e.g., second user U2) or any other suitable entity may then interface with device protection subsystem 471 in any suitable manner at operation 626 for activating one or more device protection service(s) of DP application 113c. For example, second user U2 may use its U2-ID and U2-PW account information to log-into a server of device protection subsystem 471 (e.g., from a user device other than electronic device 100) and may then interface with a service of device protection subsystem 471 in any suitable manner to identify device 100 (e.g., by providing or selecting ED-ID) and activate at least one device protection service for device 100 that has previously been enabled by second user U2 on device 100 (e.g., via DP application 113c at operation 618). Such an activated service may be a "Find My Device" service that may be enable device protection subsystem 471 to adjust any suitable modes or functionalities on device 100 that may facilitate securing content of device 100 and/or enabling a user to locate device 100 (e.g., to enter a "lost mode"). For example, between operations 622 and 626, device 100 may be misplaced, lost, or stolen, such that user U2 may wish to protect device 100 in one or more ways by activating one or more device protection services of device protection subsystem 471 and DP application 113c, such as activating a service of device protection subsystem 471 that may be operative to track the location of device 100 and/or remotely control one or more functions of device 100, such as turn on an alarm and/or erase or suspend or otherwise terminate the usefulness of certain device content, such as suspend the ability for the secure element of device 100 to generate transaction credential data for use in furthering a transaction with a service provider.

In response to a device protection service of device protection subsystem 471 and DP application 113c being activated at operation 626 by device protection subsystem 471 receiving information appropriately identifying user U2 (e.g., U2-ID and/or U2-PW) and device 100 (e.g., ED-ID), device protection subsystem 471 may be operative at operation 628 to identify each suspension token associated with device 100 and then to share suspended device suspension data 678 with credential protection subsystem 491. For example, device protection subsystem 471 may be operative to identify appropriate suspension tokens ST-1 and ST-2 by identifying each suspension token that may be stored in table 473 (e.g., in second linked data entry 473b of table 473) against ED-ID and/or U2-ID and/or U2-PW as provided to device protection subsystem 471 at operation 626. Then, device protection subsystem 471 may communicate each one of identified suspension tokens ST-1 and ST-2 as at least a portion of suspended device suspension data 678 to credential protection subsystem 491 at operation 628, where suspended device suspension data 678 may include any other suitable data, such as identification of ED-ID and/or U2-ID and/or U2-PW and/or any suitable instruction that may be operative to instruct credential protection subsystem 491 to suspend each credential that may be associated with any of the identified suspension tokens, so as to carry out at least a portion of a device protection service activated for device 100 at operation 626.

Then, at operation 630, credential protection subsystem 491 may be operative to process received suspended device suspension data 678 for identifying and suspending each credential that may be associated with any of the suspension tokens identified by suspended device suspension data 678. For example, in response to receiving suspended device suspension data 678 indicative of suspension token ST-1 and suspension token ST-2, credential protection subsystem 491 may be operative to determine that the first user transaction credential uniquely identified by C1-ID may be associated with first suspension token ST-1 (e.g., by identifying C1-ID in first linked data entry 493a of table 493 as linked to ST-1 of suspended device suspension data 678) and to take any suitable actions to temporarily suspend the functionality of that first user transaction credential (e.g., by flagging the credential as a credential not to be securely processed in a transaction if received from device 100 and/or by instructing credential issuer subsystem 300 to temporarily suspend the ability of the credential from funding or otherwise furthering any transaction with any service provider). Similarly, in response to receiving suspended device suspension data 678 indicative of suspension token ST-1 and suspension token ST-2, credential protection subsystem 491 may be operative to determine that the second user transaction credential uniquely identified by C2-ID may be associated with second suspension token ST-2 (e.g., by identifying C2-ID in second linked data entry 493b of table 493 as linked to ST-2 of suspended device suspension data 678) and to take any suitable actions to temporarily suspend the functionality of that second user transaction credential (e.g., by flagging the credential as a credential not to be securely processed in a transaction if received from device 100 and/or by instructing credential issuer subsystem 300 to temporarily suspend the ability of the credential from funding or otherwise furthering any transaction with any service provider). Additionally, in response to receiving suspended device suspension data 678 indicative of suspension token ST-1 and suspension token ST-2, credential protection subsystem 491 may be operative to determine that a third user transaction credential uniquely identified by C3-ID may be associated with second suspension token ST-2 (e.g., by identifying C3-ID in a third linked data entry 493c of table 493 as linked to ST-2 of suspended device suspension data 678 (e.g., another credential that may have been provisioned on device 100 for second user U2 at another instance of operation 614)) and to take any suitable actions to temporarily suspend the functionality of that third user transaction credential (e.g., by flagging the credential as a credential not to be securely processed in a transaction if received from device 100 and/or by instructing credential issuer subsystem 300 to temporarily suspend the ability of the credential from funding or otherwise furthering any transaction with any service provider), such that two or more credentials may be associated with the same suspension token. However, it is to be appreciated that a particular unique suspension token may only be associated with one or more credentials provisioned on a particular device for a particular user.

Then, once suspended device suspension data 678 has been processed by credential protection subsystem 491 for suspending the viability of each user transaction credential associated with any suspension token identified by suspended device suspension data 678 at operation 630, credential protection subsystem 491 may be operative to generate and communicate any suitable suspended credential confirmation data 682 to device protection subsystem 471 at operation 632 that may confirm to device protection subsystem 471 that the viability of each user transaction credential associated with any suspension token identified by suspended device suspension data 678 has been properly suspended. Moreover, once device protection subsystem 471 has been instructed to activate at least one device protection service for device 100, device protection subsystem 471 may be operative to communicate any suitable device protection service command data 684 to device 100 (e.g., to DP application 113c) at operation 634, and device 100 (e.g., to DP application 113c) may be operative to receive and process such device protection service command data 684 at operation 636 for activating one or more appropriate device protection services on device 100, such as turn on an alarm (e.g., using an output component 112 of device 100) and/or lock device 100 with a passcode and/or erase or suspend or otherwise terminate the usefulness of certain device content, such as suspend the ability for secure element 145 of device 100 to use any user transaction credential to generate transaction credential data for use in furthering a transaction with a service provider (e.g., using CRS application 151 to adjust the life cycle state of each user transaction credential associated with a suspension token on device 100 (e.g., the credentials of applets 153a and 153b) to a suspended life cycle state).

At any suitable moment after operation 636 (e.g., after a lost device has been found), a user of device 100 may properly authenticate itself with device 100 (e.g., with DP application 113c) in any suitable manner at operation 638 to deactivate any suitable activated device protections services (e.g., as activated at operation 636). For example, user U1 or user U2 may access DP application 113c of device 100 (e.g., using appropriate authentication information (e.g., U1-ID and U1-PW or U2-ID and U2-PW)) that may be communicated to device protection subsystem 471 as at least a portion of device deactivation data 689 at operation 639 to instruct device protection subsystem 471 that the previously activated device protections service(s) have been deactivated on device 100. Afterwards, any user may properly authenticate itself with a user credential application of device 100 to unsuspend one or more credentials associated with that user. For example, as shown in FIG. 6, at operation 640, second user U2 may access U2C application 113e of device 100 (using any appropriate authentication information (e.g., U2-ID and U2-PW) that may then be communicated to credential protection subsystem 491 as at least a portion of second user authentication data 691 at operation 641 to authenticate second user U2 at credential protection subsystem 491 for unsuspending each appropriate credential of device 100 associated with user U2. For example, second user authentication data 691 may include U2-ID and/or U2-PW and ED-ID, which may be processed by credential protection subsystem 491 at operation 642 for identifying and unsuspending each credential that may be associated with second user U2 and device 100 identified by second user authentication data 691. For example, in response to receiving second user authentication data 691 that may be indicative of U2-ID (and/or U2-PW) and ED-ID, credential protection subsystem 491 may be operative to determine that the second user transaction credential uniquely identified by C2-ID may be associated with U2-ID (and/or U2-PW) and ED-ID (e.g., by identifying C2-ID in second linked data entry 493b of table 493 as linked to U2-ID (and/or U2-PW) and ED-ID of second user authentication data 691) and to take any suitable actions to unsuspend the functionality of that second user transaction credential (e.g., by unflagging the credential as a credential not to be securely processed in a transaction if received from device 100 and/or by instructing credential issuer subsystem 300 to unsuspend the ability of the credential from funding or otherwise furthering any transaction with any service provider). Similarly, in response to receiving second user authentication data 691 that may be indicative of U2-ID (and/or U2-PW) and ED-ID, credential protection subsystem 491 may be operative to determine that the third user transaction credential uniquely identified by C3-ID may be associated with U2-ID (and/or U2-PW) and ED-ID (e.g., by identifying C3-ID in third linked data entry 493c of table 493 as linked to U2-ID (and/or U2-PW) and ED-ID of second user authentication data 691) and to take any suitable actions to unsuspend the functionality of that third user transaction credential (e.g., by unflagging the credential as a credential not to be securely processed in a transaction if received from device 100 and/or by instructing credential issuer subsystem 300 to unsuspend the ability of the credential from funding or otherwise furthering any transaction with any service provider). Then, once second user authentication data 691 has been processed by credential protection subsystem 491 for unsuspending the viability of each user transaction credential associated with U2-ID (and/or U2-PW) and ED-ID identified by second user authentication data 691 at operation 642, credential protection subsystem 491 may be operative to generate and communicate any suitable unsuspended second user credential confirmation data 693 to device 100 (e.g., to U2C application 113e) at operation 643 that may confirm to device 100 (and a user thereof (e.g., second user U2)) that each second user transaction credential on device 100 for second user U2 has been properly unsuspended. Additionally or alternatively, as shown in FIG. 6, at operation 644, first user U1 may access U1C application 113d of device 100 (using any appropriate authentication information (e.g., U1-ID and U1-PW) that may then be communicated to credential protection subsystem 491 as at least a portion of first user authentication data 695 at operation 645 to authenticate first user U1 at credential protection subsystem 491 for unsuspending each appropriate credential of device 100 associated with user U1. For example, first user authentication data 695 may include U1-ID and/or U1-PW and ED-ID, which may be processed by credential protection subsystem 491 at operation 646 for identifying and unsuspending each credential that may be associated with first user U1 and device 100 identified by first user authentication data 695. For example, in response to receiving first user authentication data 695 that may be indicative of U1-ID (and/or U1-PW) and ED-ID, credential protection subsystem 491 may be operative to determine that the first user transaction credential uniquely identified by C1-ID may be associated with U1-ID (and/or U1-PW) and ED-ID (e.g., by identifying C1-ID in first linked data entry 493a of table 493 as linked to U1-ID (and/or U1-PW) and ED-ID of first user authentication data 695) and to take any suitable actions to unsuspend the functionality of that first user transaction credential (e.g., by unflagging the credential as a credential not to be securely processed in a transaction if received from device 100 and/or by instructing credential issuer subsystem 300 to unsuspend the ability of the credential from funding or otherwise furthering any transaction with any service provider). Then, once first user authentication data 695 has been processed by credential protection subsystem 491 for unsuspending the viability of each user transaction credential associated with U1-ID (and/or U1-PW) and ED-ID identified by first user authentication data 695 at operation 646, credential protection subsystem 491 may be operative to generate and communicate any suitable unsuspended first user credential confirmation data 697 to device 100 (e.g., to U1C application 113d) at operation 647 that may confirm to device 100 (and a user thereof (e.g., first user U1)) that each first user transaction credential on device 100 for first user U1 has been properly unsuspended. It is to be understood that operations 644-647 may occur before operations 640-643 or may occur without operations 640-643 ever occurring. In some embodiments, operations 644-647 may occur before operations 638-643 or may occur without operations 638-643 ever occurring.

In some embodiments, only the credentials associated with the user that activates any device protection service(s) may be suspended. For example, a device protection service of device protection subsystem 471 and DP application 113c may be activated at operation 626 by device protection subsystem 471 receiving information appropriately identifying user U2 (e.g., U2-ID and/or U2-PW) and device 100 (e.g., ED-ID), and also an instruction to only suspend credentials associated with that user when activating the service(s). Alternatively, AE subsystem 400 may be configured to only suspend the credentials of the user activating the services. Therefore, device protection subsystem 471 may be operative at operation 628 to identify each suspension token associated with device 100 and then to share suspended device suspension data 678 with credential protection subsystem 491 that may be indicative of the user that activated the service(s) (e.g., U2-ID and/or U2-PW) such that credential protection subsystem 491 may then only suspend the credentials associated with the suspension token that is also associated with that user (e.g., in table 493). For example, device protection subsystem 471 may be operative to identify appropriate suspension tokens ST-1 and ST-2 by identifying each suspension token that may be stored in table 473 (e.g., in second linked data entry 473b of table 473) against ED-ID and/or U2-ID and/or U2-PW as provided to device protection subsystem 471 at operation 626. Then, device protection subsystem 471 may communicate each one of identified suspension tokens ST-1 and ST-2 as at least a portion of suspended device suspension data 678 to credential protection subsystem 491 at operation 628, where suspended device suspension data 678 may include any other suitable data, such as identification of U2-ID and/or U2-PW and/or any suitable instruction that may be operative to instruct credential protection subsystem 491 to suspend each credential that may be associated with any of the identified suspension tokens but also that identification of user U2, so as to carry out at least a portion of a device protection service activated for device 100 at operation 626. Such that, then, at operation 630, credential protection subsystem 491 may be operative to process received suspended device suspension data 678 for identifying and suspending each credential that may be associated with any of the suspension tokens identified by suspended device suspension data 678 that is also associated with user U2. For example, in response to receiving suspended device suspension data 678 indicative of suspension token ST-1 and suspension token ST-2 and U2-ID, credential protection subsystem 491 may be operative to determine that although the first user transaction credential uniquely identified by C1-ID may be associated with first suspension token ST-1 (e.g., by identifying C1-ID in first linked data entry 493a of table 493 as linked to ST-1 of suspended device suspension data 678) it is not also associated with user U2's U2-ID and thus may not take any suitable actions to temporarily suspend the functionality of that first user transaction credential (e.g., by flagging the credential as a credential not to be securely processed in a transaction if received from device 100 and/or by instructing credential issuer subsystem 300 to temporarily suspend the ability of the credential from funding or otherwise furthering any transaction with any service provider). However, in response to receiving suspended device suspension data 678 indicative of suspension token ST-1 and suspension token ST-2 and user U2's U2-ID, credential protection subsystem 491 may be operative to determine that the second user transaction credential uniquely identified by C2-ID may be associated with second suspension token ST-2 and user U2's U2-ID (e.g., by identifying C2-ID in second linked data entry 493b of table 493 as linked to ST-2 and user U2's U2-ID of suspended device suspension data 678) and to take any suitable actions to temporarily suspend the functionality of that second user transaction credential (e.g., by flagging the credential as a credential not to be securely processed in a transaction if received from device 100 and/or by instructing credential issuer subsystem 300 to temporarily suspend the ability of the credential from funding or otherwise furthering any transaction with any service provider). Additionally, in response to receiving suspended device suspension data 678 indicative of suspension token ST-1 and suspension token ST-2 and user U2's U2-ID, credential protection subsystem 491 may be operative to determine that a third user transaction credential uniquely identified by C3-ID may be associated with second suspension token ST-2 and user U2's U2-ID (e.g., by identifying C3-ID in a third linked data entry 493c of table 493 as linked to ST-2 and user U2's U2-ID of suspended device suspension data 678 (e.g., another credential that may have been provisioned on device 100 for second user U2 at another instance of operation 614)) and to take any suitable actions to temporarily suspend the functionality of that third user transaction credential (e.g., by flagging the credential as a credential not to be securely processed in a transaction if received from device 100 and/or by instructing credential issuer subsystem 300 to temporarily suspend the ability of the credential from funding or otherwise furthering any transaction with any service provider), such that two or more credentials may be associated with the same suspension token. Therefore, only the credentials associated with a suspension token of device 100 and with the user that activated the device protection service(s) at operation 626 may be suspended or otherwise manipulated by AE subsystem 400 at operation 630.

Moreover, any suitable user of system 1 may be provided with administrator ("admin") privileges (e.g., admin log-in credentials to device 100 and/or to device protection subsystem 471 and/or to credential protection subsystem 491) that may enable that user to have any privileges associated with user U1 and with user U2, such that an admin user may suspend a particular one, some, or each credential of user U1 and/or a particular one, some, or each credential of user U2.

It is understood that the operations shown in process 600 of FIG. 6 are only illustrative and that existing operations may be modified or omitted, additional operations may be added, and the order of certain operations may be altered. Further, in some implementations, two or more operations may occur in parallel or in a different sequence than described.

Description of FIG. 7

FIG. 7 is a flowchart of an illustrative process 700 for protecting an electronic device using a device protection server, wherein the electronic device includes a device identifier, a first suspension token and an associated first credential for a first user associated with a first user identifier, and a second suspension token and an associated second credential for a second user associated with a second user identifier. At operation 702 of process 700, device suspension data may be received with the device protection server from the electronic device, where the device suspension data may include the first suspension token, the second suspension token, the device identifier, and the second user identifier (e.g., device suspension data 670). At operation 704 of process 700, the device suspension data received at operation 702 may be stored at the device protection server (e.g., similar to operation 622). At operation 706 of process 700, after operation 704, the device protection server may receive a device protection enablement request that may include the device identifier and the second user identifier (e.g., similar to operation 626). At operation 708 of process 700, the device protection server may identify each one of the first suspension token and the second suspension token as being stored at the device protection server in the stored device suspension data with both the device identifier and the second user identifier of the received device protection enablement request. At operation 710 of process 700, the device protection server may communicate to a remote subsystem credential suspension data that is operative to instruct the remote subsystem to suspend every credential associated with the identified first suspension token and to suspend every credential associated with the identified second suspension token (e.g., device suspension data 678).

It is understood that the operations shown in process 700 of FIG. 7 are only illustrative and that existing operations may be modified or omitted, additional operations may be added, and the order of certain operations may be altered.

Further Description of FIGS. 1-7

One, some, or all of the processes described with respect to FIGS. 1-7 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

The present disclosure recognizes that the use of such personal information data, in the present technology, such as current location of a user device 100, can be used to the benefit of users. For example, the personal information data can be used to provide better security and risk assessment for a financial transaction being conducted. Accordingly, use of such personal information data enables calculated security of a financial transaction. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps or conduct certain operations for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of financial transaction services, the present technology can be configured to allow users to select to "opt in" or "opt out" of participation in the collection of personal information data during registration for such services. In another example, users can select not to provide location information for financial transaction services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, financial transaction services can be provided by inferring preferences or situations based on non-personal information data or a bare minimum amount of personal information, such as the financial transaction being conducted by the device associated with a user, other non-personal information available to the financial transaction services, or publicly available information.

FURTHER APPLICATIONS OF DESCRIBED CONCEPTS

While there have been described systems, methods, and computer-readable media for managing credentials of multiple users on an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for protecting an electronic device using a device protection server and a credential protection server, wherein the electronic device comprises a device identifier, the method comprising:
    receiving, at the electronic device from the credential protection server, a first suspension token and an associated first credential for a first user;
    storing, on the electronic device, the first suspension token and the associated first credential;
    receiving, at the electronic device from the credential protection server, a second suspension token and an associated second credential for a second user associated with a second user identifier;
    storing, on the electronic device, the second suspension token and the associated second credential; and
    transmitting, to the device protection server from the electronic device, device suspension data, the device suspension data comprising:
        the first suspension token;
        the second suspension token;
        the device identifier; and the
        second user identifier.

2. The method of claim 1, wherein the transmitting occurs when the second user is logged-into the electronic device and the first user is logged-out of the electronic device.

3. The method of claim 1, further comprising, prior to the transmitting and after the storing the second suspension token and the associated second credential;
    enabling, at the electronic device, a device protection service using the second user identifier, wherein the transmitting occurs in response to the enabling.

4. The method of claim 1, further comprising, prior to the storing the second suspension token and the associated second credential;
    enabling, at the electronic device, a device protection service using the second user identifier, wherein the transmitting occurs in response to the storing the second suspension token and the associated second credential.

5. The method of claim 1, wherein the transmitted device suspension data enables the device protection server to suspend every credential associated with every suspension token of the transmitted device suspension data.

6. The method of claim 1, further comprising, prior to the transmitting;
    sending, to the device protection server from the electronic device, earlier device suspension data, the earlier device suspension data comprising:
        the first suspension token;
        the second suspension token;
        the device identifier; and
        a first user identifier associated with the first user.

7. The method of claim 6, wherein the sending occurs when the first user is logged-into the electronic device and the second user is logged-out of the electronic device.

8. The method of claim 6, further comprising, prior to the sending and after the storing the second suspension token and the associated second credential;
    enabling, at the electronic device, a device protection service using the first user identifier, wherein the sending occurs in response to the enabling.

9. The method of claim 6, further comprising, prior to the storing the second suspension token and the associated second credential;
    enabling, at the electronic device, a device protection service using the first user identifier, wherein the sending occurs in response to the storing the second suspension token and the associated second credential.

10. The method of claim 6, wherein the transmitting occurs when the second user is logged-into the electronic device and the first user is logged-out of the electronic device.

11. The method of claim 6, further comprising, prior to the transmitting and after the sending;
    enabling, at the electronic device, a device protection service using the second user identifier, wherein the transmitting occurs in response to the enabling.

12. The method of claim 6, wherein:
    the earlier transmitted device suspension data enables the device protection server to suspend every credential associated with every suspension token of the earlier transmitted device suspension data when requested by the first user identifier; and
    the transmitted device suspension data enables the device protection server to suspend every credential associated with every suspension token of the transmitted device suspension data when requested by the second user identifier.

13. The method of claim 6, wherein the first suspension token is communicated, to the device protection server from the electronic device, with one of the first user identifier or the second user identifier.

14. The method of claim 13, wherein the second suspension token is communicated, to the device protection server from the electronic device, with one of the first user identifier or the second user identifier.

15. The method of claim 1, wherein:
    the first suspension token is communicated, to the device protection server from the electronic device, with one of a first user identifier associated with the first user or the second user identifier; and
    the second suspension token is communicated, to the device protection server from the electronic device, with one of the first user identifier or the second user identifier.

16. A method for protecting an electronic device using a device protection server and a credential protection server, wherein the electronic device comprises a device identifier, a secure element, a first user credential application for a first user associated with a first user identifier, a second user credential application for a second user associated with a second user identifier, and a device protection application, the method comprising:
    receiving, at the first user credential application of the electronic device from the credential protection server, first user credential data comprising a first suspension token that is associated with first user transaction credential information;
    storing the first user transaction credential information on the secure element;
    after the receiving the first user credential data, registering, using the first user credential application, the first suspension token with the device protection application;
    after the receiving the first user credential data, receiving, at the second user credential application of the electronic device from the credential protection server, second user credential data comprising a second suspension token that is associated with second user transaction credential information;

storing the second user transaction credential information on the secure element;

after the receiving the second user credential data, registering, using the second user credential application, the second suspension token with the device protection application; and one of the following:
  after the receiving the second user credential data and in response to the first user enabling a device protection service on the electronic device, transmitting, to the device protection server from the electronic device, first device suspension data, the first device suspension data comprising:
    the first suspension token;
    the second suspension token;
    the device identifier; and
    the first user identifier; or
  after the receiving the second user credential data and in response to the second user enabling a device protection service on the electronic device, transmitting, to the device protection server from the electronic device, second device suspension data, the second device suspension data comprising:
    the first suspension token;
    the second suspension token;
    the device identifier; and
    the second user identifier.

17. The method of claim 16, further comprising, after the receiving the second user credential data and in response to the first user enabling a device protection service on the electronic device;
  transmitting, to the device protection server from the electronic device, first device suspension data, the first device suspension data comprising:
    the first suspension token;
    the second suspension token;
    the device identifier; and
    the first user identifier.

18. The method of claim 16, further comprising, after the receiving the second user credential data and in response to the second user enabling a device protection service on the electronic device;
  transmitting, to the device protection server from the electronic device, second device suspension data, the second device suspension data comprising:
    the first suspension token;
    the second suspension token;
    the device identifier; and
    the second user identifier.

19. The method of claim 18, further comprising:
  after the transmitting the second device suspension data and in response to the first user enabling the device protection service on the electronic device, transmitting, to the device protection server from the electronic device, first device suspension data, the first device suspension data comprising:
    the first suspension token;
    the second suspension token;
    the device identifier; and
    the first user identifier.

20. A method for protecting an electronic device using a device protection server and a credential protection server, wherein the electronic device comprises a first user credential application for a first user associated with a first user identifier, a second user credential application for a second user associated with a second user identifier, and a device protection application, the method comprising:
  receiving, at the electronic device from the credential protection server, first user credential data comprising a first suspension token that is associated with first user transaction credential information;
  after the receiving the first user credential data, registering, using the first user credential application, the first suspension token with the device protection application;
  after the receiving the first user credential data, receiving, at the second user credential application of the electronic device from the credential protection server, second user credential data comprising a second suspension token that is associated with second user transaction credential information;
  after the receiving the second user credential data, registering, using the second user credential application, the second suspension token with the device protection application; and
  communicating, from the electronic device to the device protection server, suspension data, wherein the suspension data comprises:
    each suspension token registered with the device protection application; and
    one of the first user identifier and the second user identifier.

* * * * *

UNITED STATES PATENT AND TRADEMARK OFFICE
CERTIFICATE OF CORRECTION

| | |
|---|---|
| PATENT NO. | : 11,277,394 B2 |
| APPLICATION NO. | : 16/792809 |
| DATED | : March 15, 2022 |
| INVENTOR(S) | : Karthik Narayanan et al. |

It is certified that error appears in the above-identified patent and that said Letters Patent is hereby corrected as shown below:

In the Specification

Column 5, Line 9-10: "systems (e.g., 900 MHz, 2.4 GHz, and 5.6 GHz commtmication systems), infrared, TCP/IP, SCTP, DHCP, HTTP," should read -- systems (e.g., 900 MHz, 2.4 GHz, and 5.6 GHz communication systems), infrared, TCP/IP, SCTP, DHCP, HTTP, --.

Column 10, Line 63: "at least one credential key 155b)." should read -- at least one credential key 155b'). --.

Column 17, Line 4: "key 155bc). Issuer subsystem 300 may be responsible for" should read -- key 155b'). Issuer subsystem 300 may be responsible for --.

Signed and Sealed this
Eighteenth Day of July, 2023

Katherine Kelly Vidal
*Director of the United States Patent and Trademark Office*